US012800715B2

(12) United States Patent
Fina

(10) Patent No.: US 12,800,715 B2
(45) Date of Patent: Nov. 17, 2026

(54) METHODS AND SYSTEMS FOR VALIDATING AUTOMOTIVE RADAR PITCH USING ELEVATION SIDELOBE MEASUREMENTS

(71) Applicant: Waymo LLC, Mountain View, CA (US)

(72) Inventor: Michael Dane Fina, Glen Ellyn, IL (US)

(73) Assignee: Waymo LLC, Mountain View, CA (US)

( * ) Notice: Subject to any disclaimer, the term of this patent is extended or adjusted under 35 U.S.C. 154(b) by 364 days.

(21) Appl. No.: 18/522,666

(22) Filed: Nov. 29, 2023

(65) Prior Publication Data

US 2025/0172662 A1 May 29, 2025

(51) Int. Cl.
*G01S 7/40* (2006.01)
*G01S 13/60* (2006.01)

(52) U.S. Cl.
CPC ............ *G01S 7/4039* (2021.05); *G01S 13/60* (2013.01)

(58) Field of Classification Search
CPC ....... G01S 7/4039; G01S 13/60; G01S 13/931
See application file for complete search history.

(56) References Cited

U.S. PATENT DOCUMENTS

| | | | |
|---|---|---|---|
| 5,485,156 | A | 1/1996 | Manseur |
| 10,288,720 | B1 | 5/2019 | Adolf |

(Continued)

FOREIGN PATENT DOCUMENTS

| | | | |
|---|---|---|---|
| CN | 103235292 | B | 12/2014 |
| CN | 110943949 | B | 3/2020 |

(Continued)

OTHER PUBLICATIONS

U.S. Appl. No. 18/522,666_Dec. 17, 2025_CN_115396835_A_M.pdf, machine translation of CN-115396835-A (Year: 2022).*

(Continued)

*Primary Examiner* — Resha Desai
*Assistant Examiner* — Kenneth W Good
(74) *Attorney, Agent, or Firm* — McDonnell Boehnen Hulbert & Berghoff LLP

(57) ABSTRACT

Example embodiments relate to techniques and systems for using elevation sidelobe measurements to validate automotive radar pitch. A vehicle computing system can cause a radar to transmit radar signals into an environment of the vehicle and receive radar data corresponding to the transmitted radar signals. The computing system identifies a sidelobe represented in the radar data and estimates a relative measurement corresponding to the sidelobe. The relative measurement corresponding to the sidelobe represents at least an elevation measurement or an azimuth measurement corresponding to the sidelobe. The computing system then determines a pitch error based on a comparison between the relative measurement corresponding to the sidelobe and a reference sidelobe measurement and performs a calibration process for subsequent operation of the radar based on the pitch error. A computing system can also use elevation sidelobe measurements to estimate vehicle speed, detect road grade changes, and detect precipitation on the road.

20 Claims, 19 Drawing Sheets

(56) References Cited

U.S. PATENT DOCUMENTS

| | | | | |
|---|---|---|---|---|
| 10,866,305 | B1 * | 12/2020 | Campbell | G01S 7/2923 |
| 2005/0017891 | A1 | 1/2005 | Kuroda | |
| 2005/0116854 | A1 * | 6/2005 | Beez | H01Q 19/062 342/107 |
| 2012/0235851 | A1 | 9/2012 | Park | |
| 2021/0041528 | A1 * | 2/2021 | Chen | G01S 7/03 |
| 2022/0349996 | A1 * | 11/2022 | Fina | G01S 13/931 |
| 2023/0056655 | A1 * | 2/2023 | Talai | G01S 7/4034 |
| 2023/0261389 | A1 | 8/2023 | Lim | |
| 2023/0286548 | A1 | 9/2023 | Tanaka | |
| 2024/0176010 | A1 * | 5/2024 | Fedor | G01S 13/867 |
| 2025/0130313 | A1 * | 4/2025 | Jiang | G01S 7/4034 |
| 2025/0153719 | A1 * | 5/2025 | Jonasson | B60W 40/10 |
| 2025/0157172 | A1 * | 5/2025 | Xu | G06V 10/46 |

FOREIGN PATENT DOCUMENTS

| | | | | | |
|---|---|---|---|---|---|
| CN | 111625024 | B | | 9/2020 | |
| CN | 111983602 | A | | 11/2020 | |
| CN | 113625237 | A | | 11/2021 | |
| CN | 114325610 | A | | 4/2022 | |
| CN | 115015846 | A | | 9/2022 | |
| CN | 115396835 | A | * | 11/2022 | H04W 4/80 |
| WO | WO-2022174630 | A1 | * | 8/2022 | G01S 13/58 |

OTHER PUBLICATIONS

U.S. Appl. No. 18/522,666_Mar. 24, 2026_WO_2022174630_A1_M.pdf, machine translation of WO-2022174630-A1 (Year: 2022).*

Desheng et al., "Radar tracking control system design for phase comparison ranging", International Conference on Logistics Engineering, Management and Computer Sicence (LEMCS 2014).

* cited by examiner

METHODS AND SYSTEMS FOR VALIDATING AUTOMOTIVE RADAR PITCH USING ELEVATION SIDELOBE MEASUREMENTS

BACKGROUND

Advancements in computing, sensors, and other technologies have enabled some vehicles to navigate safely between locations autonomously, i.e., without requiring input from a human driver. By processing sensor measurements of the surrounding environment in real-time, a semi-autonomous or autonomous vehicle can transport passengers or objects (e.g., cargo) between locations while avoiding obstacles, obeying traffic requirements, anticipating movements of nearby agents, and performing other actions that are typically conducted by a driver. Shifting both decision-making and control of the vehicle over to vehicle systems can allow passengers to devote their attention to tasks other than driving.

SUMMARY

Example embodiments relate to techniques and systems for using elevation sidelobe measurements to validate automotive radar pitch. A vehicle computing system or another computing system can perform disclosed techniques to analyze the pitch of one or more radars on the vehicle over time after the radar is installed and used onboard the vehicle during navigation. The computing system can use elevation sidelobe measurements (or other sidelobe measurements) to monitor radar pitch and perform other actions that can enhance vehicle performance during navigation. For instance, the computing system may use sidelobe measurements to detect and measure changes in the road grade, to help maintain a position of the vehicle within a lane, to estimate road reflectivity and a speed of the vehicle, and to detect trenches, speed bumps, potholes, and other terrain anomalies encountered during navigation.

In one aspect, an example method is described. The method involves causing, by a computing system coupled to a vehicle, a radar to transmit radar signals into an environment of the vehicle and receiving, at the computing system, radar data corresponding to the transmitted radar signals. The method also involves identifying the sidelobe represented in the radar data and estimating a relative measurement corresponding to the sidelobe in the radar frame. The relative measurement corresponding to the sidelobe represents at least an elevation measurement or an azimuth measurement corresponding to the sidelobe. The method further involves determining a pitch error based on a comparison between the relative measurement corresponding to the sidelobe and a reference sidelobe measurement and performing a calibration process for subsequent operation of the radar based on the pitch error.

In another aspect, an example system is described. The system includes a radar coupled to a vehicle and a computing device. The computing device is configured to cause the radar to transmit radar signals into an environment of the vehicle and receive radar data corresponding to the transmitted radar signals. The computing device is also configured to identify a sidelobe represented in the radar data and estimate a relative measurement corresponding to the sidelobe. The relative measurement corresponding to the sidelobe represents at least an elevation measurement or an azimuth measurement corresponding to the sidelobe. The computing device is also configured to determine a pitch error based on a comparison between the relative measurement corresponding to the sidelobe and a reference sidelobe measurement and perform a calibration process for subsequent operation of the radar based on the pitch error.

In yet another aspect, a non-transitory computer-readable medium is described. The non-transitory computer-readable medium is configured to store instructions, that when executed by a computing system comprising one or more processors, causes the computing system to perform operations. The operations involve causing a radar to transmit radar signals into an environment of a vehicle, receiving radar data corresponding to the transmitted radar signals, identifying a sidelobe represented in the radar data, and estimating a relative measurement corresponding to the sidelobe. The relative measurement corresponding to the sidelobe represents at least an elevation measurement or an azimuth measurement corresponding to the sidelobe. The operations also involve determining a pitch error based on a comparison between the relative measurement corresponding to the sidelobe and a reference sidelobe measurement and, based on the pitch error, performing a calibration process for subsequent operation of the radar.

These as well as other aspects, advantages, and alternatives will become apparent to those of ordinary skill in the art by reading the following detailed description, with reference, where appropriate, to the accompanying drawings.

DETAILED DESCRIPTION

Figure 1:
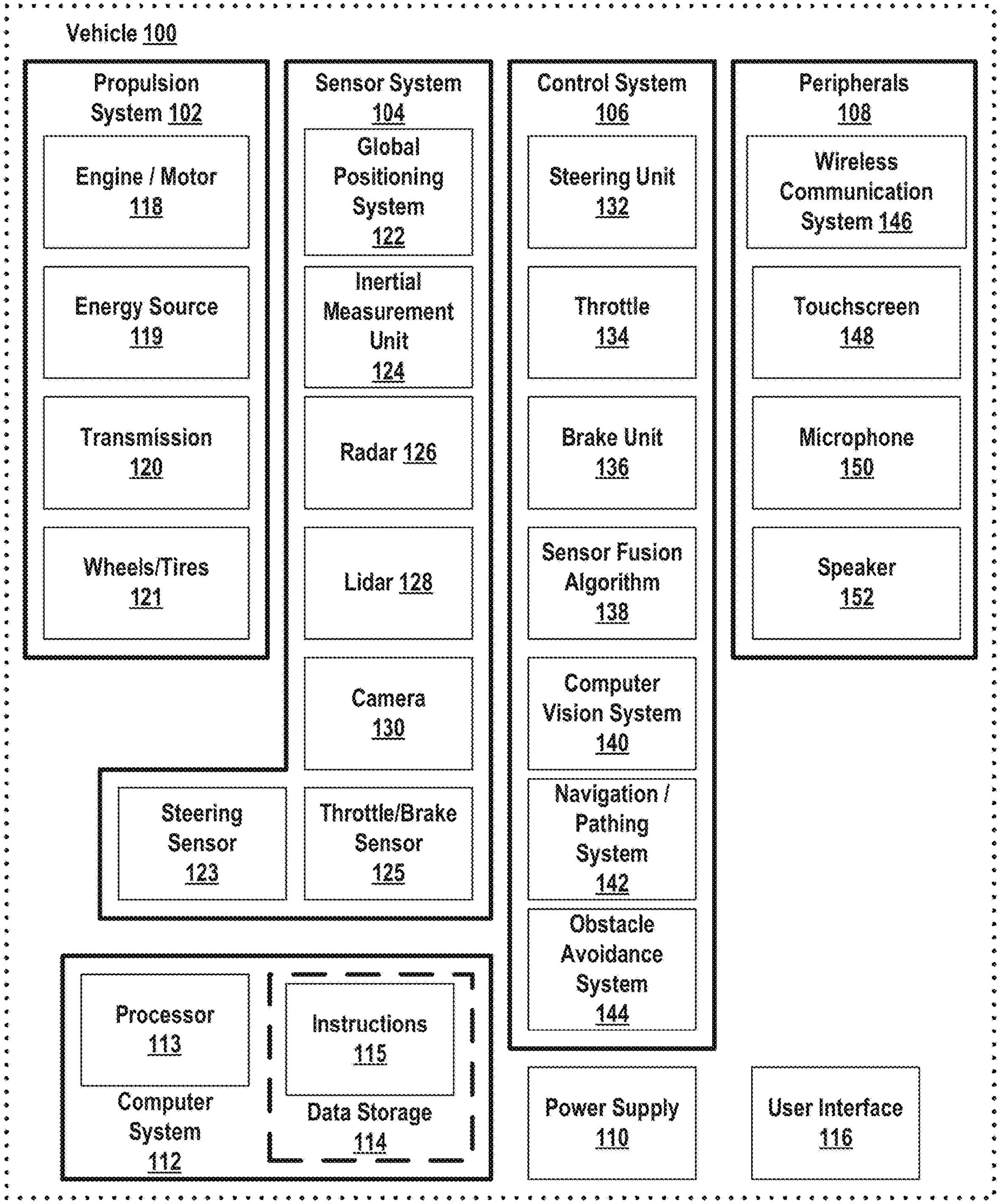
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Automotive radar involves using radio waves to detect the presence, distance, direction, and speed of objects in the surrounding environment of a vehicle. The vehicle radar system emits a radio signal from a transmitter, which then bounces off nearby objects and returns to a receiver. By analyzing the characteristics of the returned signal, the vehicle radar system can determine the location, speed, and direction of objects located in the environment, such as other vehicles, pedestrians, road boundaries, and obstacles. In some cases, radar data is used by a vehicle's advanced driver assistance systems (ADAS) or Automated Driving Systems (ADS) to provide warnings to the driver or even take autonomous actions to avoid collisions. In other cases, a vehicle control system uses radar data when determining a control strategy for autonomous navigation by the vehicle.

Radar pitch is the relative angle in the face at the antenna for a mounted radar to the vehicle in an upward/downward direction with respect to ground. Automotive radars often have a specification set to a nominal pitch (e.g., zero degrees). A pitch error can arise when the radar is mounted to the vehicle. Sources of pitch error may include poor pitch tolerance at the vehicle-radar mount or a failure to correctly seat or fasten the radar to the mount. In general, radar requirements are sensitive to pitch error.

Pitch error may be evaluated when installed using an inclinometer or another tool. In addition, the pitch error can then be corrected using a mount-pitch correction (such as by reseating the radar, applying a small shim or using an adjustable pitch mount built into the mount assembly bracket). These adjustment techniques, however, are costly approaches that require technicians to spend time manually calibrating the pitch of the radar. In some cases, the pitch error may increase during use onboard the vehicle, which might then require the technicians to periodically inspect the pitch error for each radar in time. Manual inspection versus an automated pitch validator additionally introduces a tradeoff in inspection frequency (and related technician cost) and latency in detecting that the pitch is out of spec, which results in setting more aggressive pitch tolerances than the raw requirement.

The elevation sidelobe represents an undesirable artifact in the antenna design process. In some cases, however, there are select applications where the elevation sidelobe may be used to gather information about the environment. In particular, the elevation sidelobe is an area of high antenna gain despite not being in the antenna main lobe. Although the location of the sidelobe may change slightly by radar unit, a computing system can identify the sidelobe during radar unit calibration in cases where an absolute position is required or after pitch calibration when the radar is already installed on the vehicle. Due to the high gain of the elevation sidelobe, it is possible to obtain high signal-to-noise (SNR) measurements off near-range objects. Owing to the elevation sidelobes elevation (e.g., 15-20 degrees from vehicle ground plane), the sidelobe measurements can also make the road a candidate target for estimation. For radar pitch estimation, the range to the sidelobe may be used directly to estimate information about the pitch of the radar.

Example techniques and systems presented herein enable automated pitch validation and correction. Such techniques involve a computing system using sidelobe measurements to analyze the pitch of a radar (or multiple radars) over time after each radar is installed and used onboard a vehicle. The sidelobe measurements (e.g., elevation and azimuth) of a radar transmitting through a pitched radome can be analyzed over time to check if the pitch of the radar has changed. In some cases, the sidelobe measurements are compared to an absolute measurement, which can show how much the radar's pitch has changed since the radar was initially mounted on the vehicle. For instance, a vehicle computing system can generate the absolute measurement shortly after the radar is initially installed and calibrated on the vehicle and subsequently compare future measurements of the same sidelobe to detect potential changes that may require further actions by the computing system. As such, a vehicle computing system may perform disclosed techniques to detect changes in the pitch of radars mounted to the vehicle.

The disclosed techniques can also be used to perform other actions, such as identifying the speed of the vehicle, detecting changes in the grade of the road, and/or detecting precipitation on the road. For instance, a vehicle computing system can compare sidelobe measurements to recent sidelobe measurements to determine adjustments in the vehicle speed. In some examples, the computing system may estimate the speed of the vehicle by first locating the elevation sidelobe then measuring the Doppler of the elevation sidelobe. Using rough estimates of the elevation sidelobe azimuth and elevation, the computing system can project the Doppler estimate onto the body front frame of reference for longitudinal speed or project to the body side frame of reference to form a lateral speed estimate. Vehicle systems can use the longitudinal speed and/or lateral speed estimates when performing operations during navigation.

In some examples, a computing system can estimate the grade of the road or bumps on the road by monitoring the elevation measurements of the elevation sidelobe. In particular, the computing system can measure and store the elevation of the elevation sidelobe at zero-grade (flat terrain) elevation. The stored elevation for zero-grade can be used as a reference point for future analysis. The computing system can then detect offsets in elevation data of the elevation sidelobe and compare the offsets relative to the reference elevation at zero-grade to determine changes in the grade of road as the vehicle travels.

In addition, a computing system can quantify the intensity of the elevation sidelobe during vehicle navigation. In some cases, the location of the elevation sidelobe may change. If the resulting response power changes above a threshold intensity level, the computing system may determine that precipitation is present on the underlying road. In some cases, the computing system may detect abrupt changes in the elevation sidelobe location that correspond with trenches. As an example result, the computing system may change its path or initiate braking.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
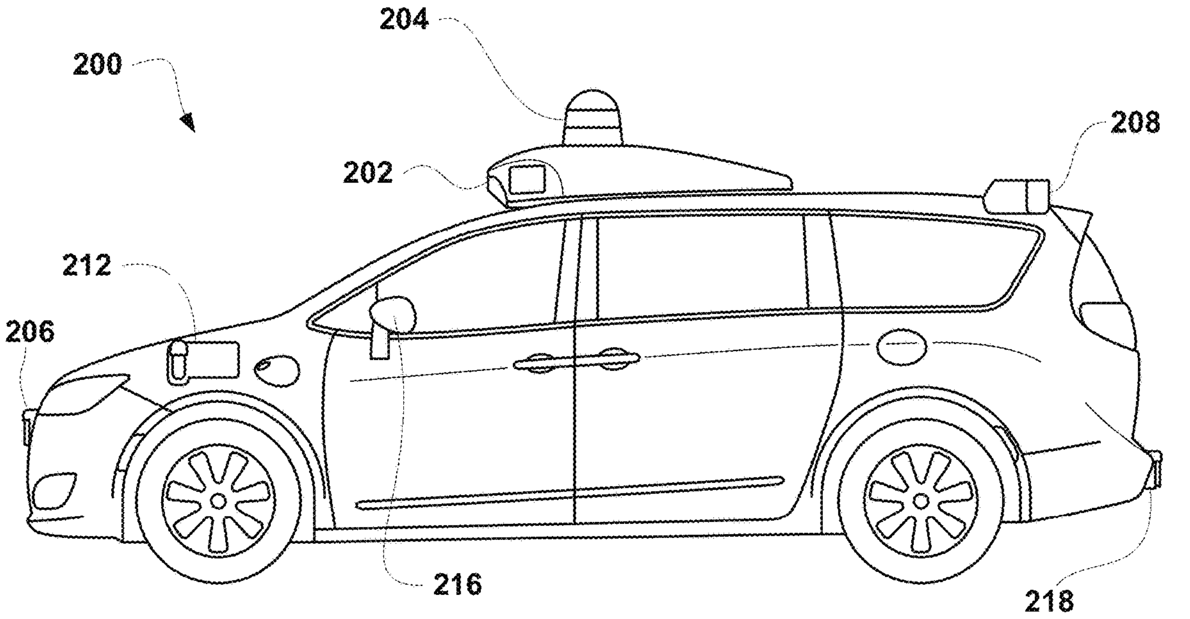
FIG. 2A is an illustration of a physical configuration of a vehicle, according to example embodiments.
Figure 2B:
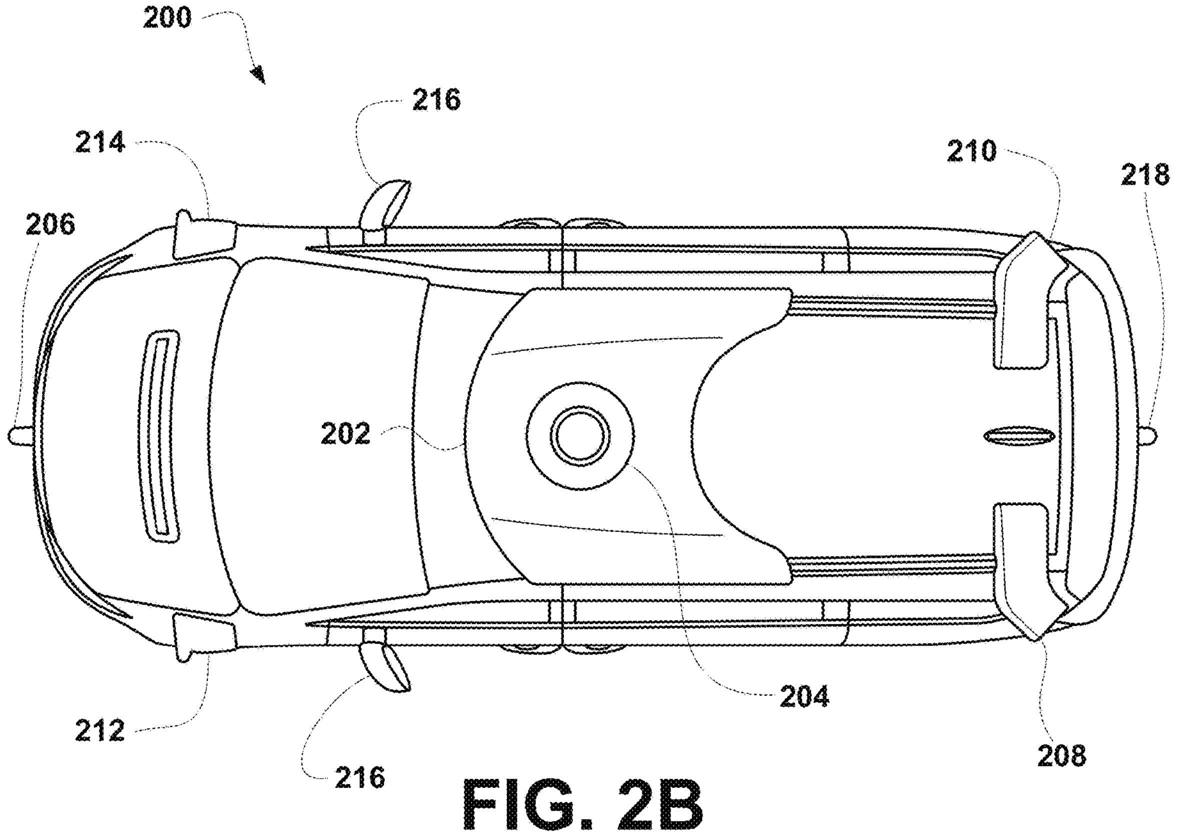
FIG. 2B is an illustration of a physical configuration of a vehicle, according to example embodiments.
Figure 2C:
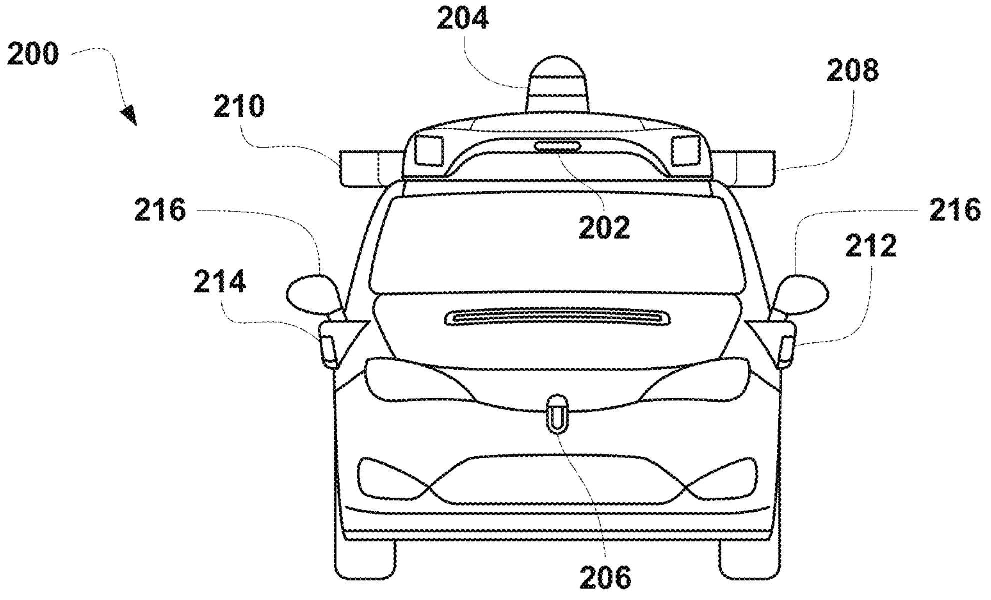
FIG. 2C is an illustration of a physical configuration of a vehicle, according to example embodiments.
Figure 2D:
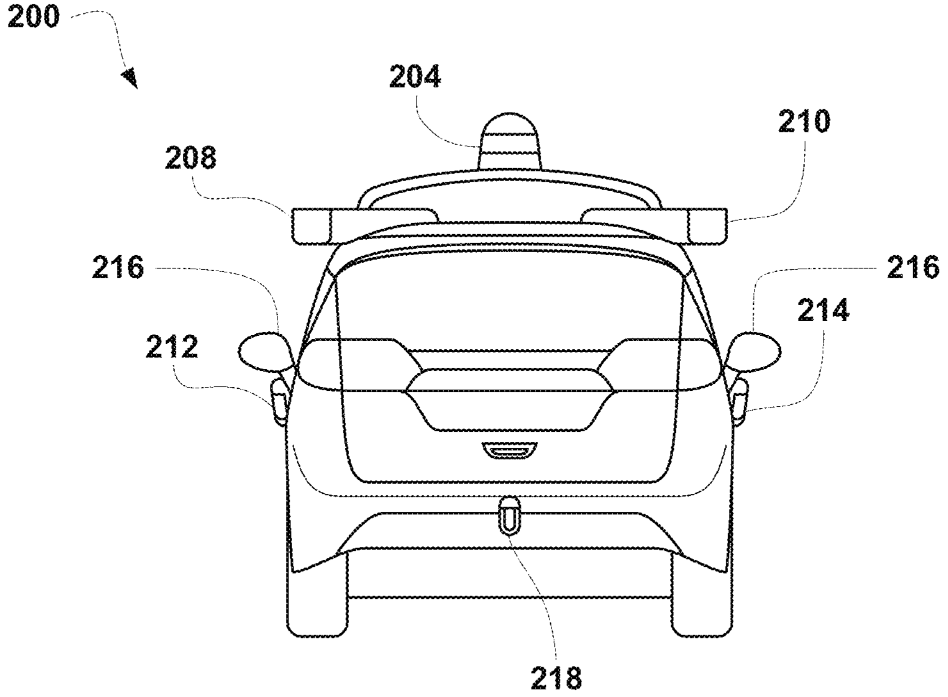
FIG. 2D is an illustration of a physical configuration of a vehicle, according to example embodiments.
Figure 2E:
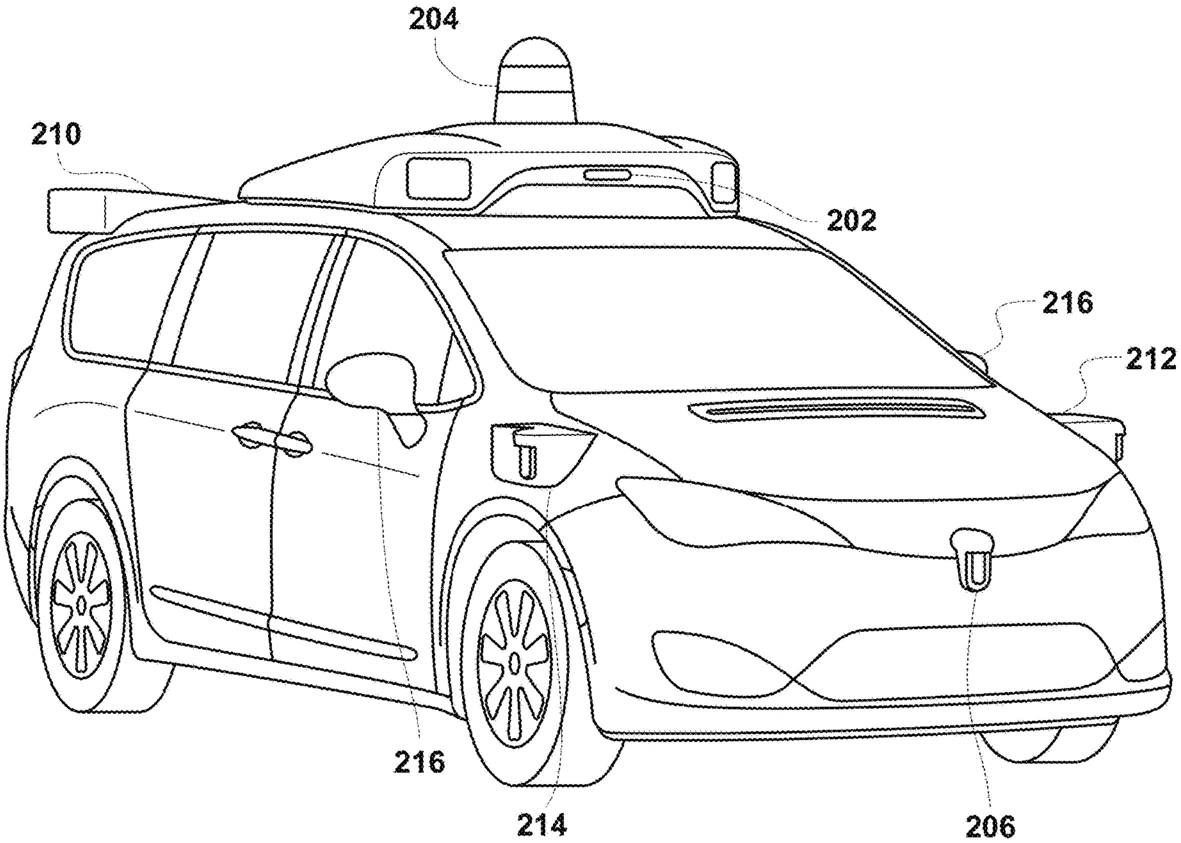
FIG. 2E is an illustration of a physical configuration of a vehicle, according to example embodiments.
Figure 2F:
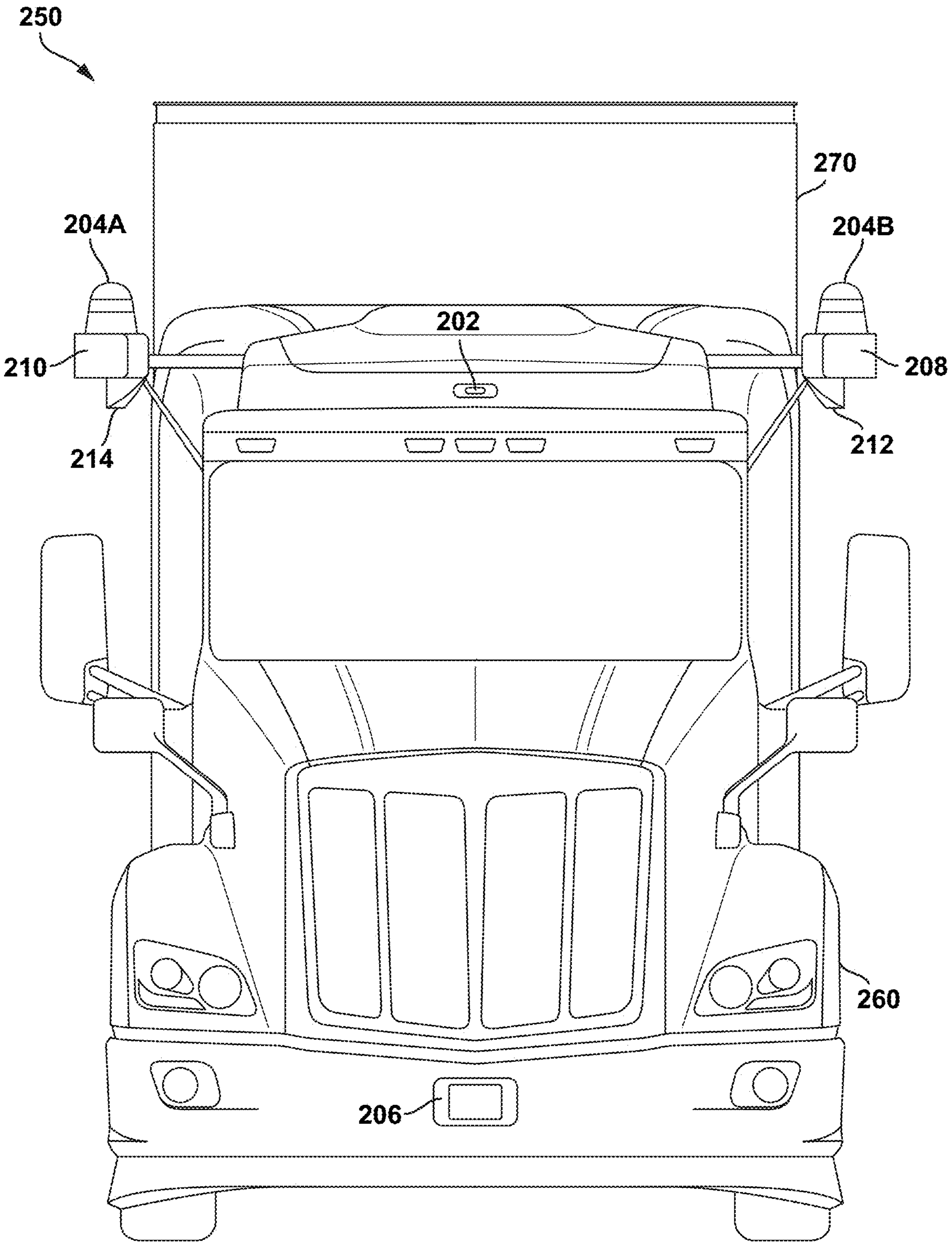
FIG. 2F is an illustration of a physical configuration of a vehicle, according to example embodiments.
Figure 2G:
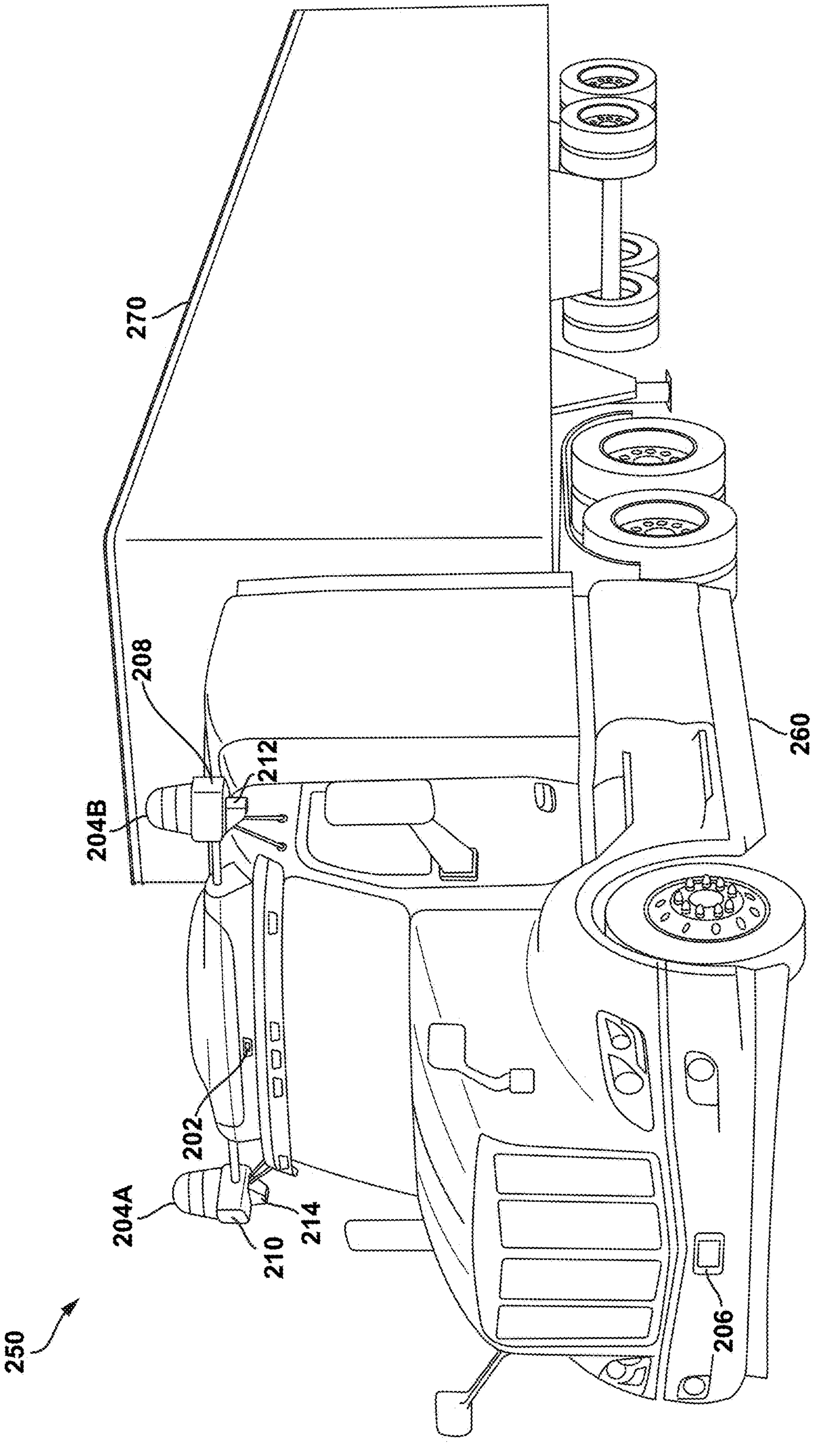
FIG. 2G is an illustration of a physical configuration of a vehicle, according to example embodiments.
Figure 2H:
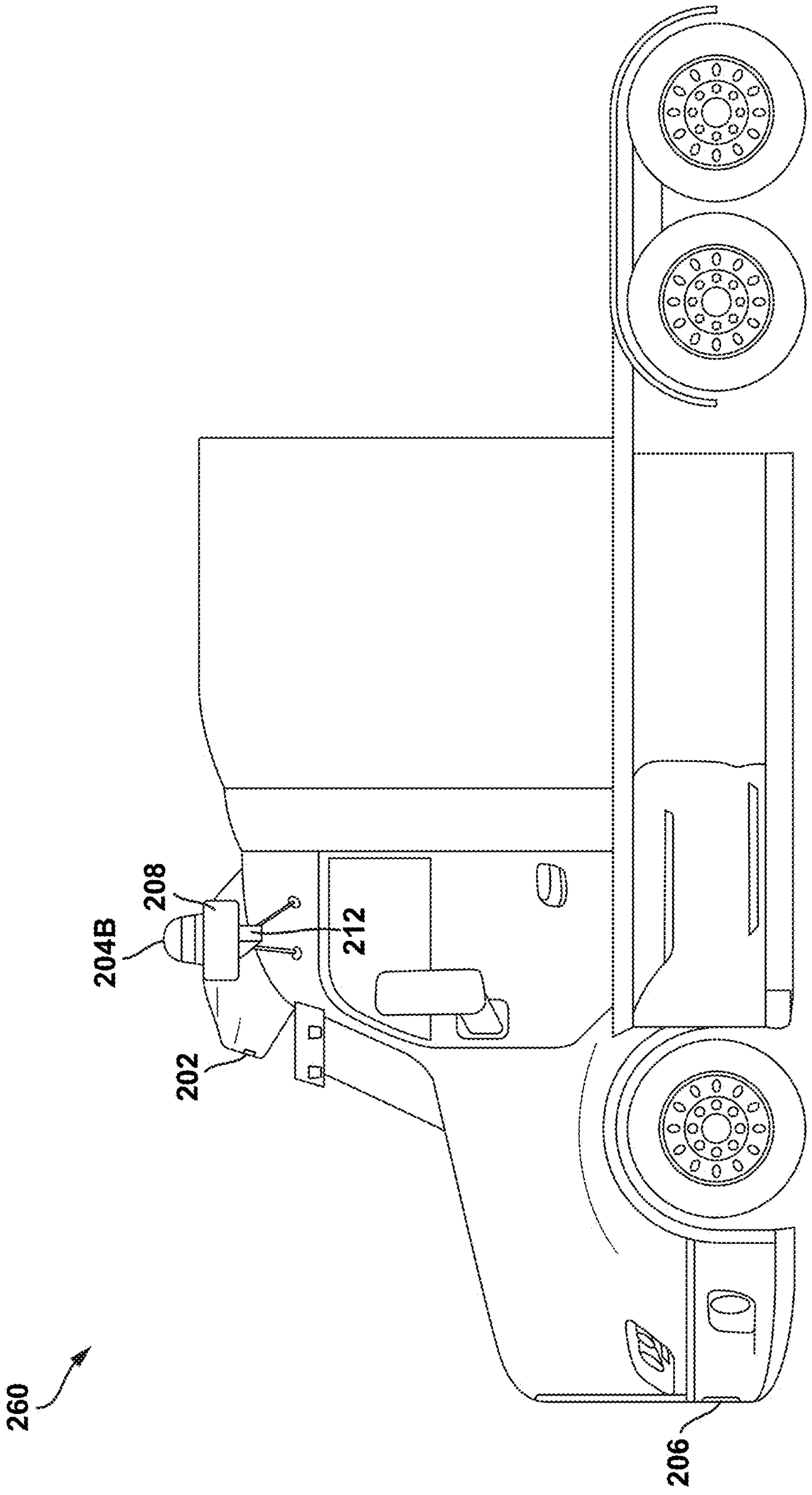
FIG. 2H is an illustration of a physical configuration of a vehicle, according to example embodiments.
Figure 2I:
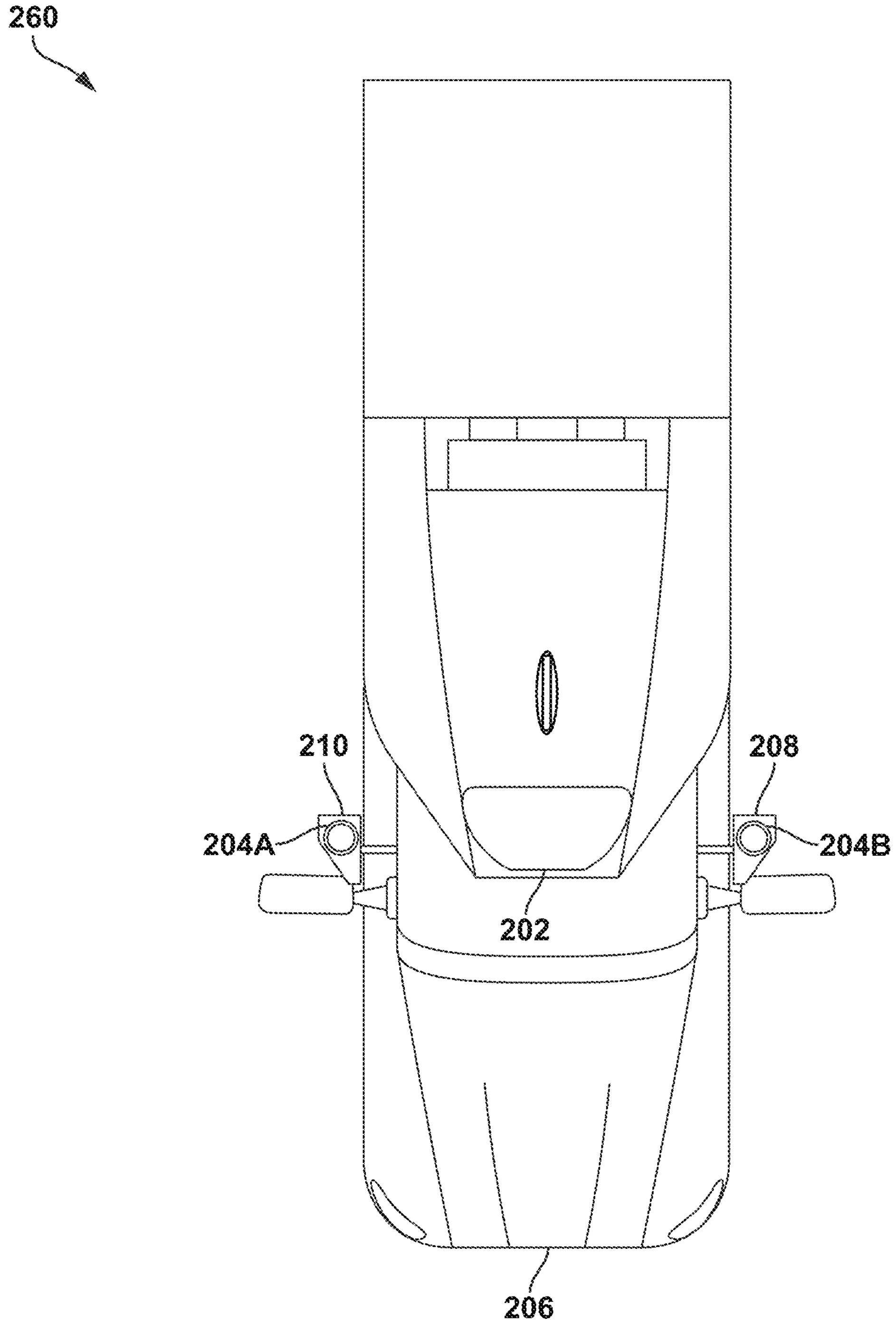
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer portion 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., semi-truck vehicle 250 or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in semi-truck vehicle 250

Figure 2J:
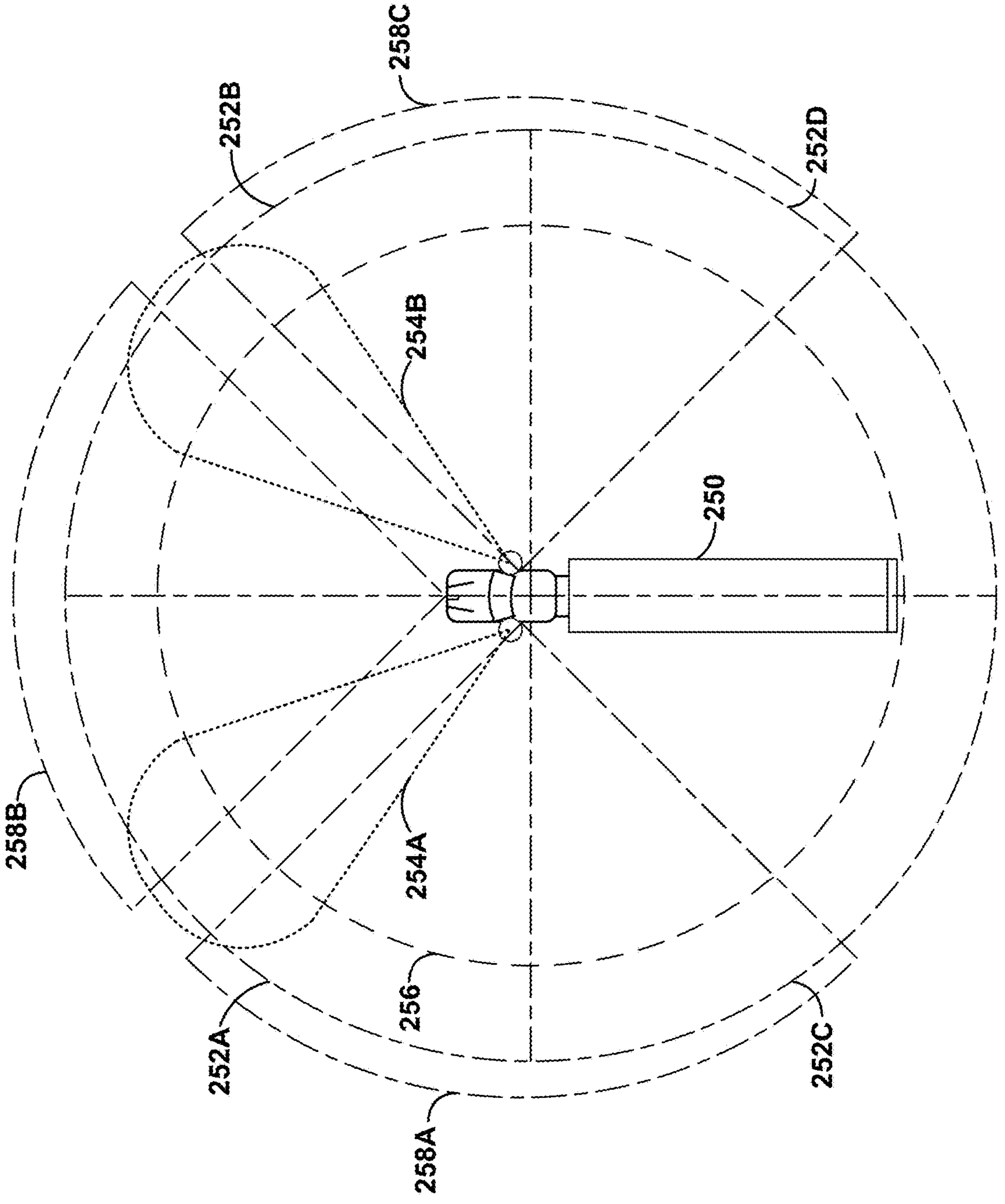
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
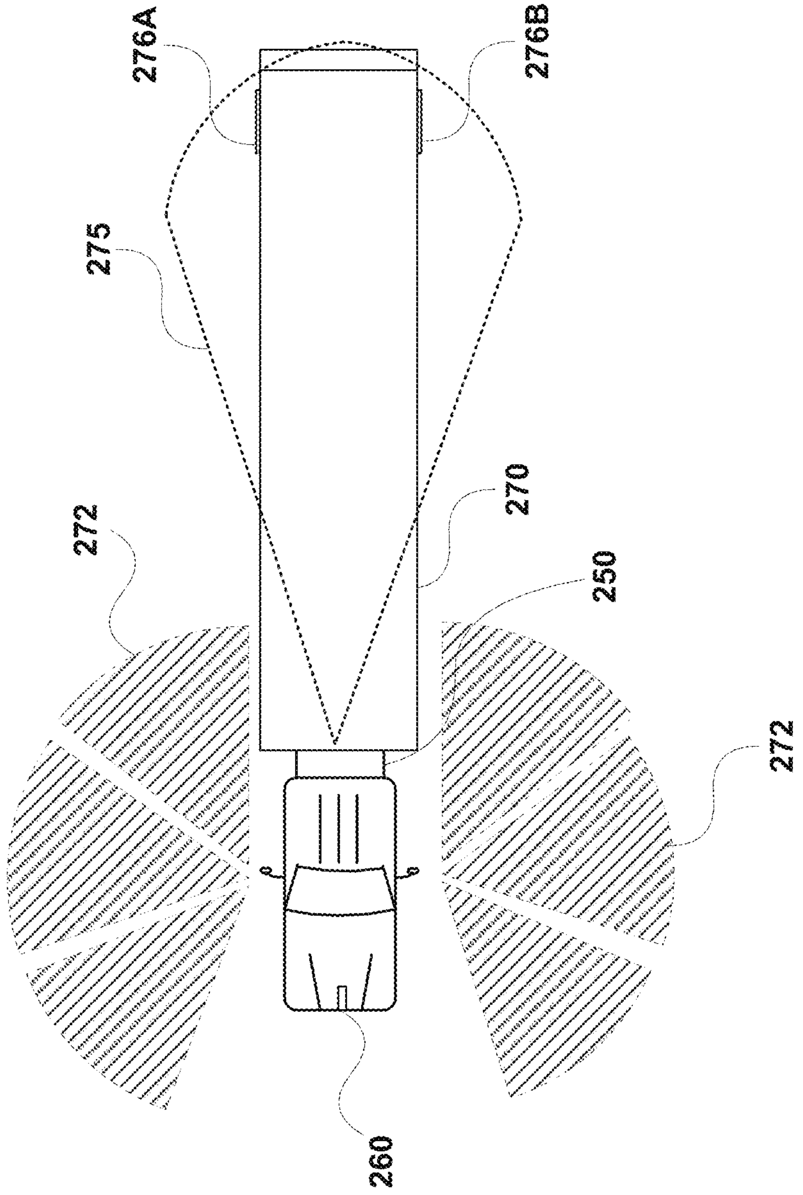
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
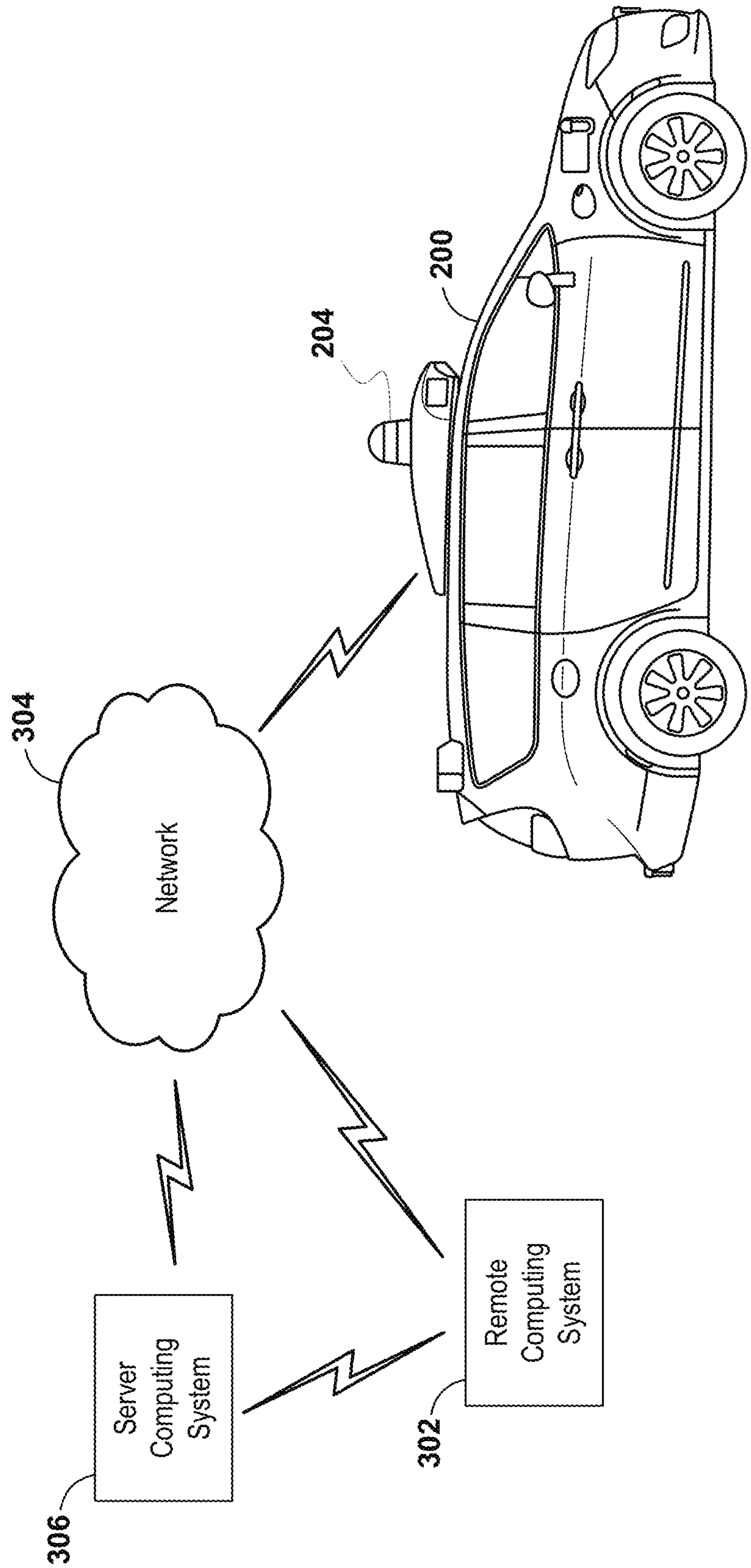
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environmental data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
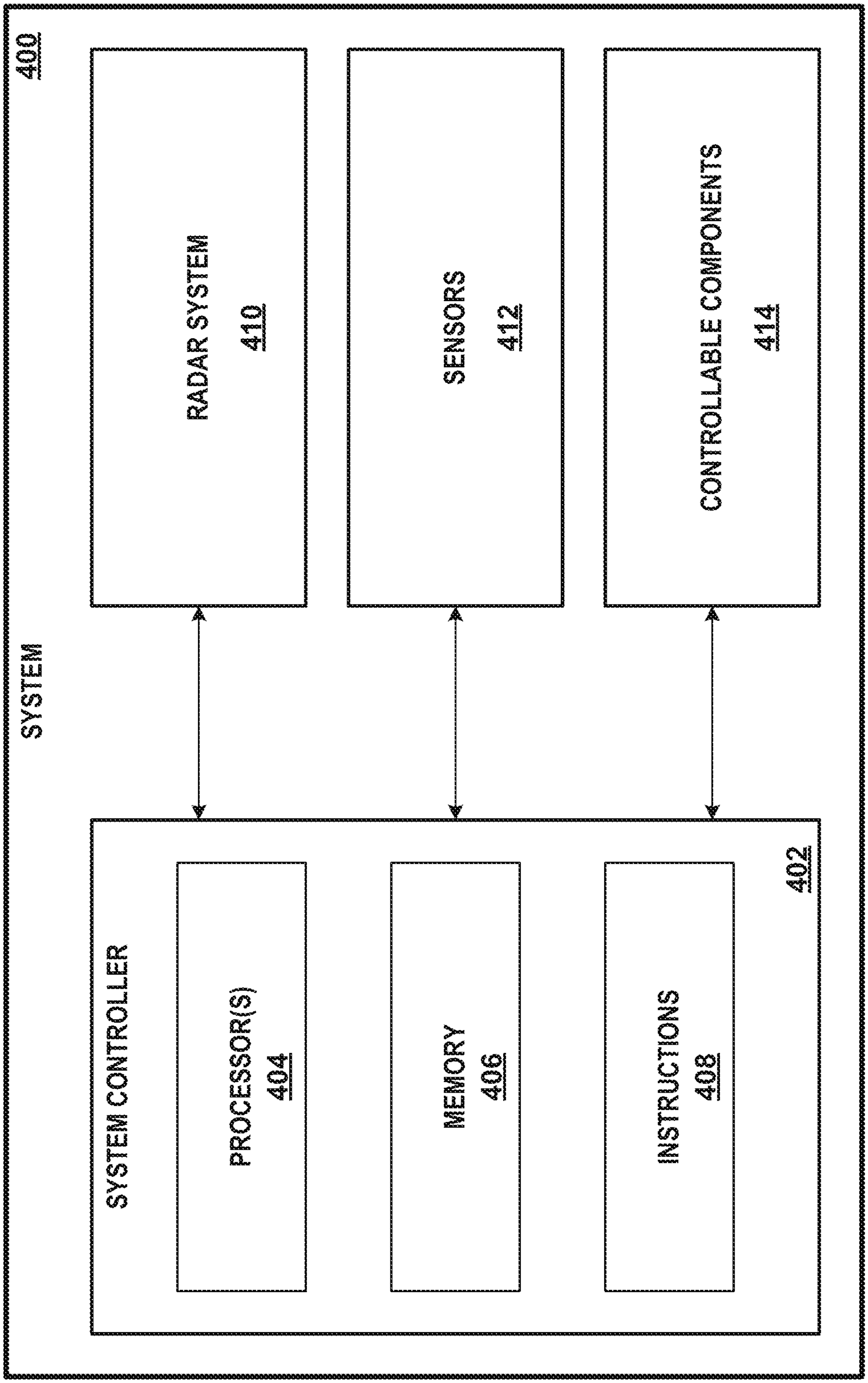
FIG. 4 is a block diagram of a system including a radar unit, according to example embodiments.

FIG. 4 is a block diagram of a system, according to example embodiments. In particular, FIG. 4 shows system 400 that includes system controller 402, radar system 410, sensors 412, and controllable components 414. System controller 402 includes processor(s) 404, memory 406, and instructions 408 stored on memory 406 and executable by processor(s) 404 to perform functions, such as the operations disclosed herein.

Processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 410 can be used in autonomous or semi-autonomous vehicles for navigation and object detection by using radio waves to detect and measure the distance, speed, and direction of objects in the surrounding environment. Radar system 410 can include one or multiple radar units, which each consists of a radar transmitter that emits radio waves and a radar receiver that captures the reflected waves from objects. By analyzing the time it takes for the waves to return and their frequency shifts (Doppler Effect), radar system 410 can determine the presence, location, and movement of objects.

In the context of autonomous or semi-autonomous vehicles, radar system 410 provides measurements that can assist with navigation and collision avoidance. Radar units are typically mounted on the vehicle's exterior, such as the front, rear, and sides. During navigation, radar system 410 may continuously emit radio waves in various directions, scanning the environment around the vehicle. When the waves encounter an object, they bounce back to a radar receiver, thereby enabling radar system 410 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 410 can enhance the vehicle's perception capabilities and contribute to safer and more reliable navigation.

Radar system 410 offers operational benefits over other types of sensors in some aspects, such as cameras and lidar. Radar can perform well in adverse weather conditions, such as rain, fog, or dust, where other sensors might be limited. In particular, radio waves emitted by radar system 410 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 410 enables the vehicle (or a driver of the vehicle) to make informed decisions about potential collision risks and adjust its behavior accordingly. In some cases, radar system 410 can also offer a longer range of measurements and broader field of view when compared to other sensors coupled to the vehicle.

Similarly, system controller 402 may use outputs from radar system 410 and sensors 412 to determine the characteristics of system 400 and/or characteristics of the surrounding environment. For example, sensors 412 may include one or more of a GPS, an IMU, an image capture device (e.g., a camera), a light sensor, a heat sensor, one or more lidar devices, and other sensors indicative of parameters relevant to system 400 and/or the surrounding environment. Radar system 410 is depicted as separate from sensors 412 for purposes of example, and may be considered as part of or as sensors 412 in some examples.

Based on characteristics of system 400 and/or the surrounding environment determined by system controller 402 based on the outputs from radar system 410 and the sensors 412, system controller 402 may control the controllable components 414 to perform one or more actions. For example, system 400 may correspond to a vehicle, in which case the controllable components 414 may include a braking system, a turning system, and/or an accelerating system of the vehicle, and system controller 402 may change aspects of these controllable components based on characteristics determined from radar system 410 and/or sensors 412 (e.g., when system controller 402 controls the vehicle in an autonomous or semi-autonomous mode). Within examples, radar system 410 and sensors 412 are also controllable by system controller 402.

Figure 5:
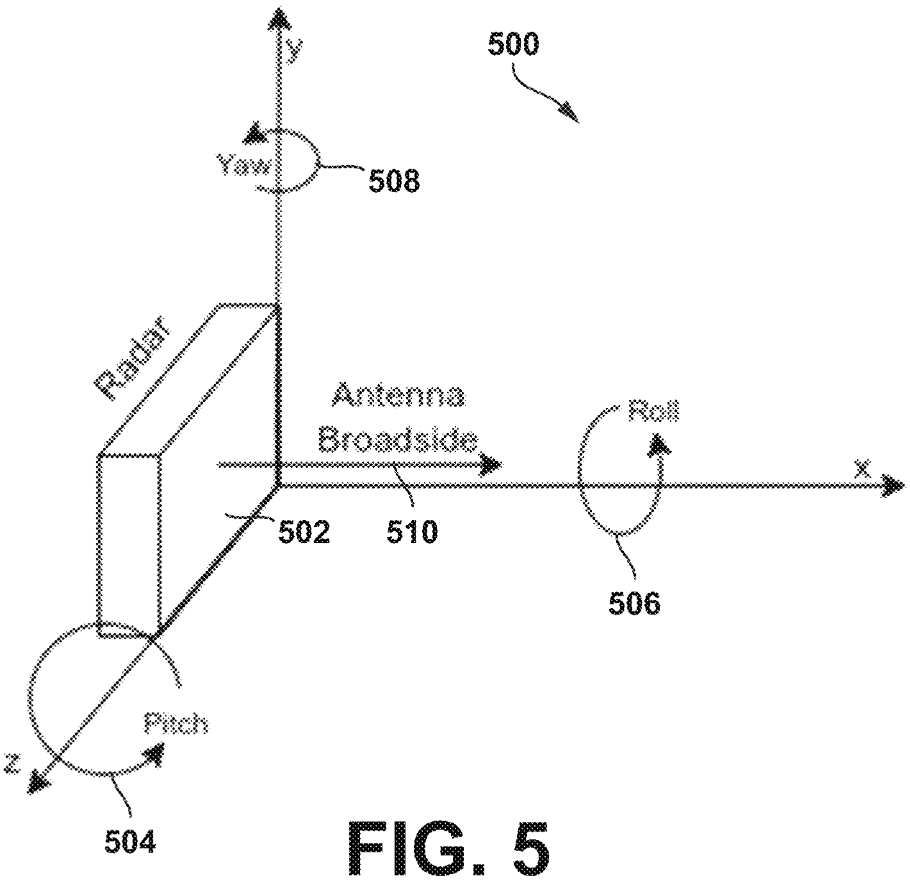
FIG. 5 is a diagram showing pitch, roll, and yaw for a radar, according to example embodiments.

FIG. 5 illustrates a diagram 500 showing the rotational axes for pitch 504, roll 506, and yaw 508 for radar 502 with antenna broadside 510. In the example embodiment, radar 502 is shown positioned at the origin of the Cartesian grid having an X-axis, a Y-axis, and a Z-axis. Diagram 500 demonstrates pitch 504, roll 506, and yaw 508 when radar 502 is oriented to have antenna broadside 510 extending along the X-axis.

As shown in FIG. 5, diagram 500 depicts radar 502 as physically separate from a vehicle, but can still be used to understand how pitch 504, roll 506, and yaw 508 can impact a vehicle radar when mounted at a location on a vehicle. For a vehicle radar system, the orientation and movement of each vehicle radar can be described by pitch, roll, and yaw with the values of these parameters impacting the overall performance of the radars during use while the vehicle navigates. Maintaining these parameters within threshold ranges over time as designed can keep the radar in a correct position and help minimize measurement errors when using the radar to detect and track objects in different directions and altitudes.

Pitch 504 refers to the pitch angle or pitch axis of radar 502. The pitch angle represents the angular displacement or tilt of radar 502 in the vertical plane around its horizontal axis represented by the Z-axis. In the context of a vehicle-mounted radar, pitch 504 is designed to maintain an optimal angle of elevation for radar 502. As such, pitch 504 impacts the ability of radar 502 to scan and track objects at different distances and elevations. Keeping pitch 504 of radar 502 as originally mounted on the vehicle can maintain a consistent angle for radar 502 to accurately detect and track vehicles in different lanes and at varying distances on the road, including when the vehicle is navigating on slopes or hills.

In general, radar pitch is the relative angle in the face at the antenna for a mounted radar to the vehicle in an upward/downward direction with respect to the ground. Automotive radars will commonly have a specification set to the nominal pitch (e.g., 0 degrees), but the pitch can be adjusted downward for radars mounted at higher positions on a vehicle (e.g., radars mounted at higher positions on trucks relative to the ground).

In some cases, a pitch error can be introduced when the radar is mounted to the vehicle. Sources of pitch error may include poor pitch tolerance at the vehicle-radar mount, failure to correctly seat or fasten the radar to the mount, or the fasteners/mounts changing position over time, which can occur due to shock and vibration experienced during navigation.

Roll 506 corresponds to the rotation of radar 502 around the longitudinal axis of radar 502 that is parallel to the ground and represented by the X-axis in FIG. 5. Maintaining a consistent roll 506 can keep radar 502 level and perpendicular to the road surface. At a level orientation, radar 502 is able to maintain optimal antenna gain at expected target locations that appear during vehicle motion.

Yaw 508 corresponds to the rotation of radar 502 in the horizontal plane around a vertical axis represented by the Y-Axis in FIG. 5. In some cases, a mount may enable yaw 508 of radar 502 to be adjusted and enable radar 502 to steer in different directions. In other examples, the mount may maintain yaw 508 at a fixed value and use beam steering to scan different areas at varying azimuths.

Antenna broadside 510 for radar 502 refers to the orientation of antennas on radar 502 when radar 502 is pointed perpendicular or at a right angle to the direction in which the radar system is looking or scanning. Diagram 500 shows antenna broadside 510 extending along the X-axis. In this position, the radar antenna of radar 502 emits or receives signals in a direction that is expected to align with nominal targets that might be encountered during vehicle navigation.

Figure 6:
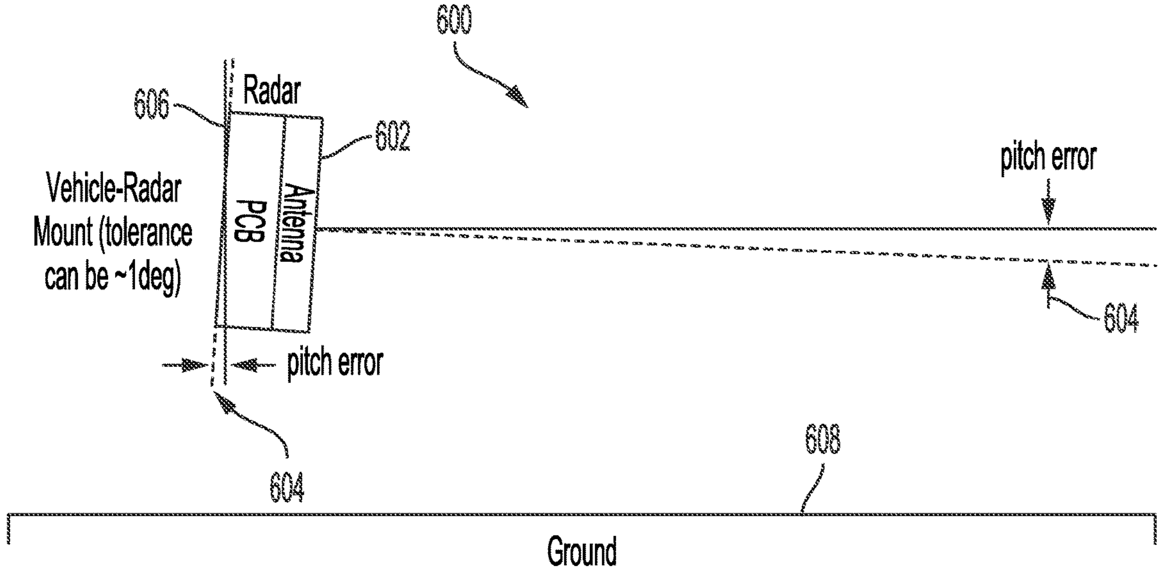
FIG. 6 is a diagram showing a pitch error caused by an imperfect vehicle-radar mount, according to example embodiments.

FIG. 6 illustrates a diagram 600 showing radar 602 operating with radar pitch error 604 caused by an imperfect connection at vehicle-radar mount 606. Diagram 600 illustrates how radar 602 can be coupled at a location on a vehicle via vehicle-radar mount 606 and shows how radar pitch error 604 can arise over time during navigation due to vibrations, weather conditions, or other factors adjusting the position of radar 602 relative to the vehicle. The size, type, position, and orientation of radar 602 can vary when used on a vehicle.

In general, radars can be mounted to a vehicle or other mechanical devices (e.g., a robot) in various ways. The mount strategy implemented for each radar can depend on the specific application of the radar as well as the design of the vehicle. For instance, some vehicle radar systems utilize radars that are mounted in or on the front bumper or grille of a vehicle to enable the radars to have a clear line of sight while having some protection from weather and debris. In some cases, one or multiple radars are mounted on the roof of the vehicle to provide an unobstructed view of the surroundings. When coupled at a roof location, the radar can have broader coverage, but might also suffer from higher pitch errors during navigation. Similarly, vehicle radars can also be mounted on side mirrors or fenders, among other places on the vehicle.

In some cases, the mount between a radar and the vehicle can change over time and introduce pitch error. As shown in diagram 600, vehicle-radar mount 606 can change over time and cause radar 602 to have pitch error 604. Vehicle-radar mount 606 can become loose or physically offset in another way relative to its original arrangement when installed on the vehicle. After vehicle-radar mount 606 shifts from its original orientation, rather than transmit parallel to ground 608, radar 602 may transmit at a different angle relative to the ground due to the resulting pitch error 604. In diagram 600, radar 602 is shown transmitting at a downward angle due to pitch error 604.

Pitch error 604 can cause some issues for computing systems that use radar data generated by radar 602. In addition, in some instances, pitch error 604 may increase over time. In some cases, when pitch error 604 increases, the radar data produced by radar 602 may become less accurate relative to original expectations of the vehicle radar system.

In general, radar requirements are sensitive to pitch error. For example, an automotive radar range requirement may state for a radar to be able to track an object according to a set of defined parameter values. Some example defined parameter values can include a radar cross section (RCS) at a range (R) and up to an elevation (EL) (over a vertical field of view) and at a threshold level of recall (e.g., 95% recall). In some cases, the antenna design of long-range radar (LRR) automotive radar antennas may be set to produce a narrow elevation main lobe in order to increase antenna gain (G). Increasing the antenna gain (G) can contribute within the following radar range equation (shown as Equation 1) to add to the max range that the radar can be used to detect and track a target as follows:

$$R_{max} = \sqrt[4]{\frac{P_t G^2 \lambda^2 \sigma}{(4\pi)^3 P_{min}}} \quad (1)$$

where $R_{max}$ represents the maximum detection range, $P_t$ represents the transmit power, G represents the antenna gain, λ represents the transmitted wavelength, σ represents the target radar cross section, and $P_{min}$ represents the minimum detectable signal.

As further shown in Equation 2, the antenna gain (G) can be represented as a function of azimuth (AZ) and elevation (EL) in the antenna frame of reference as follows:

$$G = G(AZ, EL) \quad (2)$$

Antenna gain (G) signifies an antenna or antenna array's capacity to focus and direct its emitted energy in a specified direction, typically towards a targeted area of interest. This parameter plays a pivotal role in a radar's overall performance, influencing its ability to detect and track objects across various distances. Expressed in decibels (dB), antenna gain (G) serves as a metric for the effective radiated power of the radar.

The ramifications of antenna gain extend to several aspects of radar functionality, encompassing detection range, target resolution, Radar Cross Section (RCS), noise levels, and overall coverage. Notably, a radar equipped with higher antenna gain possesses the capability to transmit and receive signals over extended distances. This heightened directional focus enhances the radar's discriminative power, particularly when distinguishing between closely situated targets.

In the context of vehicle navigation, higher antenna gain produces increased resolution, which enables vehicle systems to differentiate between multiple objects in close proximity within the environment. Moreover, a higher gain antenna contributes to the effective reduction of the RCS of a target. This reduction in noise is a direct consequence of the radar's ability to concentrate transmitted and received energy, thereby mitigating interference from undesired sources. The advantages of high antenna gain are further emphasized by the radar's capacity to produce a narrow beamwidth, which enables the radar to transmit in varied beam patterns and shapes, providing flexibility in the radar's overall operational capabilities.

It is worth noting that antenna gain experiences a rapid decline in elevations near the maximum vertical field of view. In the design realm, the introduction of an uncalibrated pitch error can potentially lead designers to overcompensate by overdesigning radar or antenna specifications. This precautionary measure aims to counteract the effects of the pitch error and ensure optimal radar performance.

In addition, pitch error can arise for vehicle radars due to various factors. Vehicle dynamics change during navigation and may cause pitch errors for one or more radars positioned on the vehicle. For instance, accelerating, decelerations, and traveling upon an uneven terrain can also cause the pitch angle of one or more radars to change, which can lead to pitch errors in the orientation of the radars. Traveling uphill or downhill can cause the radar to no longer be level.

Similarly, vibrations and shocks generated during navigation as well as the mount itself can cause pitch errors. The design, quality, and installation of the mount that couples the radar in position on the vehicle can result in pitch error over time. In some cases, calibration errors can accumulate over time and lead to pitch errors.

Various strategies can be used to mitigate pitch errors. Advanced mounting systems with pitch adjustment capabilities, dynamic compensation algorithms, and calibration processes are some techniques that help maintain the correct orientation of radars on the vehicle and minimize pitch errors that arise during vehicle navigation. For instance, pitch error may be evaluated (e.g., using an inclinometer) when installed and can be corrected (e.g., using mount-pitch correction). However, as is common with manual testing, these are relatively expensive approaches since the techniques might require technical operators and time and might likely fail to catch any change in pitch that arises overtime that an automated, periodic validator would catch.

To overcome challenges that result due to pitch error 604, vehicle systems can perform disclosed techniques to automatically adjust and adapt to pitch error 604, enabling radar measurements from radar 602 to be used during navigation. Example embodiments described herein present automated techniques that can reduce costs and the time involved with detecting and correcting the pitch errors of vehicle-mounted radars and other types of radars. Such techniques are capable of being performed onboard by vehicle computing systems that can leverage elevation sidelobe data to determine and subsequently correct for the pitch error of various radars positioned on the vehicle. In some cases, a vehicle radar system or another onboard computing system can perform disclosed techniques to detect potential pitch errors that arise for individual radars located on the vehicle and perform actions to minimize the impact of the detected pitch errors.

Some example techniques presented herein involve performing one or multiple actions based on information gathered via detecting and analyzing sidelobe data produced by one or multiple radars. The radar(s) can be positioned onboard a vehicle and used to assist with vehicle navigation.

Figure 7:
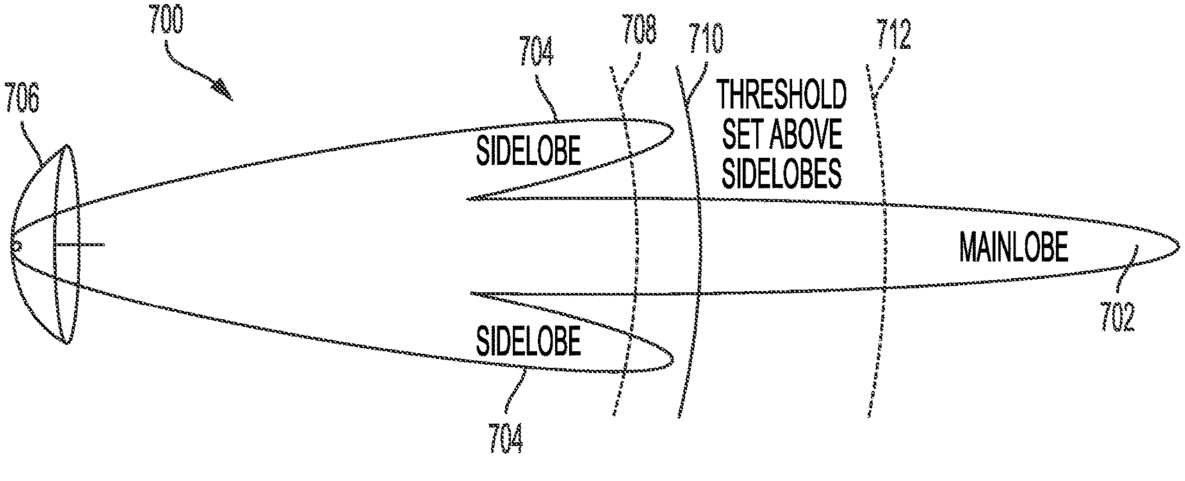
FIG. 7 is a diagram showing the main lobe and elevation sidelobes of a radiation pattern, according to example embodiments.

To demonstrate how a sidelobe can be detected and analyzed, an understanding of radar radiation patterns is useful. FIG. 7 shows an example radiation pattern, which may be transmitted by a radar (e.g., radar 706). The energy distribution within radiation pattern 700 can be abstractly divided into and labeled as main lobe 702 and elevation sidelobes 704 to better describe how the energy transmitted by radar 706 is distributed in space.

Main lobe 702 is the primary, central beam within radiation pattern 700 and represents the region where most of the transmitted and received energy is concentrated. As the most focused and powerful portion of the radar beam, main lobe 702 can be used by a vehicle radar system to detect and track objects in the environment of the vehicle. For instance, measurements captured via main lobe 702 can represent position and movement data for nearby vehicles, pedestrians, and other targets that the vehicle may encounter during navigation. The width and shape of main lobe 702 can depend on the antenna design of radar 706 as well as how radar 706 is used by the vehicle radar system. The vehicle radar system can adjust transmission parameters to adjust main lobe 702 produced by radar 706, which can involve steering main lobe 702 to capture measurements from a particular region relative to the vehicle.

Sidelobes 704 are the secondary, smaller lobes that accompany main lobe 702 in radiation pattern 700 generated by radar 706. For many radar use-cases, sidelobes 704 are considered to be an undesirable artifact of radiation pattern 700. For instance, sidelobes 704 can introduce several issues, such as increased vulnerability to interference and reduced target discrimination in some applications. In general, radiation pattern 700 can have sidelobes 704 arise at various angles away from main lobe 702 due to imperfections in the antenna design of radar 706 and/or anomalies in the vehicle radar system. In some cases, radars may be designed in a way that minimizes sidelobes to improve the performance of a radar and reduce false positives introduced by clutter and interference that occur during normal radar operation.

As further shown in FIG. 7, the vehicle radar system or another computing system can use thresholds when analyzing radiation pattern 700 to obtain radar measurements of the environment. For instance, the vehicle radar system can use sidelobe threshold 708 to monitor changes in measurements corresponding to sidelobes 704. The vehicle radar system can also use threshold 710 and threshold 712, which are both set above sidelobes 704. Threshold 710 may be used to detect when more energy within radiation pattern 700 corresponds to sidelobes 704 and threshold 712 can be used to detect and analyze measurements of main lobe 702.

The vehicle radar system can use thresholds 708, 710, 712 when analyzing radiation pattern 700 to extract meaningful information and enhance performance. The thresholds can be useful for target detection and clutter rejection. Signal strength thresholds can be used as criteria for identifying potential targets, which enables the vehicle radar system to distinguish between signals from targets and background noise or clutter. Doppler thresholds can be used for filtering out signals that lack the expected velocity characteristics of moving targets, aiding in clutter rejection and false alarm mitigation. In some cases, thresholds related to SNR can contribute to reducing false alarms by ensuring that the detected signal surpasses a certain strength relative to background noise.

In addition, the vehicle radar system can improve range solutions by using thresholds 708-712. Thresholds used for range gating techniques can help the vehicle radar system focus on specific ranges of interest. In some cases, the vehicle radar system may use pattern recognition techniques that leverage thresholds to determine how closely received signals match predefined patterns for positive target identification. The vehicle radar system may also use thresholds for analyzing frequency and pulse width to reject interference from other emitters in the environment.

Example techniques presented herein advantageously use sidelobe data to perform actions that can improve radar performance and increase vehicle systems' understanding of onboard operations as well as the surrounding environment. In general, disclosed techniques can involve detecting and analyzing one or both sidelobes 704. In some cases, a computing system can be programmed to analyze a particular sidelobe, which is described herein as an elevation sidelobe. The elevation sidelobe is an area of high antenna gain despite not being part of main lobe 702.

In some instances, the location of the elevation sidelobe can vary slightly across different radar units. A computing system can perform techniques to detect and localize the elevation sidelobe within radar measurements.

Example techniques can involve a vehicle radar system or another computing system initially detecting and measuring the elevation sidelobe (or another sidelobe) to generate a reference measurement, which can then be used to analyze future measurements of the same elevation sidelobe. For instance, the computing system can initially detect and analyze the elevation sidelobe (or another sidelobe) during a radar unit calibration process where an absolute position for the radar is required (e.g., during installation of the radar onboard the vehicle). The computing system can then store the elevation sidelobe measurements (e.g., azimuth, elevation, and/or intensity of the elevation sidelobe) in onboard memory, which can be used to compare future measurements of the elevation sidelobe to detect potential changes that can occur over time. In some cases, the computing system may use and analyze the elevation sidelobe (or another sidelobe) to compare relative to reference data generated after pitch calibration when the radar is installed on the vehicle.

When performing disclosed techniques, the computing system is able to use measurements of the elevation sidelobe for pitch analysis and other environmental analysis described herein due to the high gain of the elevation sidelobe. In particular, the high gain of the elevation sidelobe makes it possible for the radar to generate high SNR off near-range objects. In some cases, elevation sidelobes can have a measurable elevation (e.g., 15-20 degrees) from a vehicle ground plane (e.g., relative to the road). As an example result, a vehicle radar system or another computing system can use and analyze elevation sidelobe data with respect to the road to perform different estimation techniques. For example, to evaluate the pitch of the radar, the computing system may use the range to sidelobe 704 directly to estimate information about the pitch of radar 706.

To enhance the ability of the computing system to detect and analyze the elevation sidelobe, some examples involve pairing a radar with a pitched-radome that can induce an elevation sidelobe. The use of a pitched-radome can emphasize the elevation sidelobe, which can make it easier for the computing system to evaluate parameters of the elevation sidelobe when performing disclosed techniques. As such, different shapes and types of pitched-radomes can be used within examples.

Figure 8:
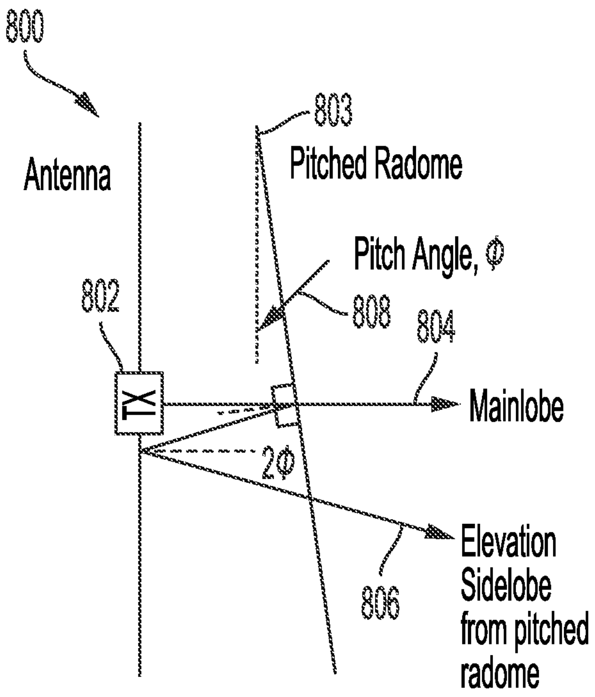
FIG. 8 is a diagram showing a pitched-radome-induced elevation sidelobe, according to example embodiments.

As an example, FIG. 8 illustrates diagram 800 showing a pitched-radome-induced elevation sidelobe 806. By adding a pitch to radome 803 (i.e., altering the orientation of radome 803 relative to the radar), elevation sidelobe 806 may be generated intentionally or through other radome optimization controls. From ray tracing, the energy of elevation sidelobe 806 is produced from the first reflection off pitched radome 803 and places elevation sidelobe 806 at an elevation of roughly twice radome pitch angle 808 in the opposite direction of the radome pitch. This is a rough estimate since the exact location depends on antenna specifics and array topology.

Radome 803 is a protective covering or enclosure designed to shield the radar antenna and associated equipment from environmental elements, such as wind, rain, and debris, without significantly degrading the performance of the radar. In some instances, radome 803 is constructed from materials that are at least partially transparent to radio waves, such as fiberglass or composite materials. This way, radome 803 allows the radar signals to pass through with minimal loss. As such, radome 803 can help preserve the integrity and functionality of the radar as the vehicle navigates through various environments.

In order to make an accurate absolute estimate of the azimuth (AZ) and the elevation (EL), the mount position for the radar can be positioned at an orientation nearly orthogonal to a flat ground with the up/down orientation of the radar matching the mount on the vehicle. A uniformly reflective area can be exposed to ensure proper sidelobe detection. The measured return by the radar may be used to accurately determine the location of the sidelobe. An accurate absolute estimate of the azimuth, elevation (AZ, EL) position of the elevation sidelobe can be made from knowledge of the height of the radar (specifically the mean height of the transmit and receive element centers) above the ground using a high resolution (high bandwidth waveform) to improve range accuracy. For instance, a vehicle computing system can factor these parameters to derive the absolute estimate of the azimuth (AZ) and elevation (EL) of the elevation sidelobe, such as after the radar is initially mounted and installed on the vehicle.

The radar frame allows the use of elevation (EL) measured from the elevation sidelobe to be used as a substitute for pitch. The key distinction between the sidelobe elevation measurement and the radar pitch lies in their reference frames, where pitch is referenced to the vehicle and elevation (EL) is referenced to the radar frame. In essence, a change in elevation (EL) in the radar frame mirrors the magnitude of pitch change in the vehicle frame, but occurs in the opposite direction.

Figure 9:
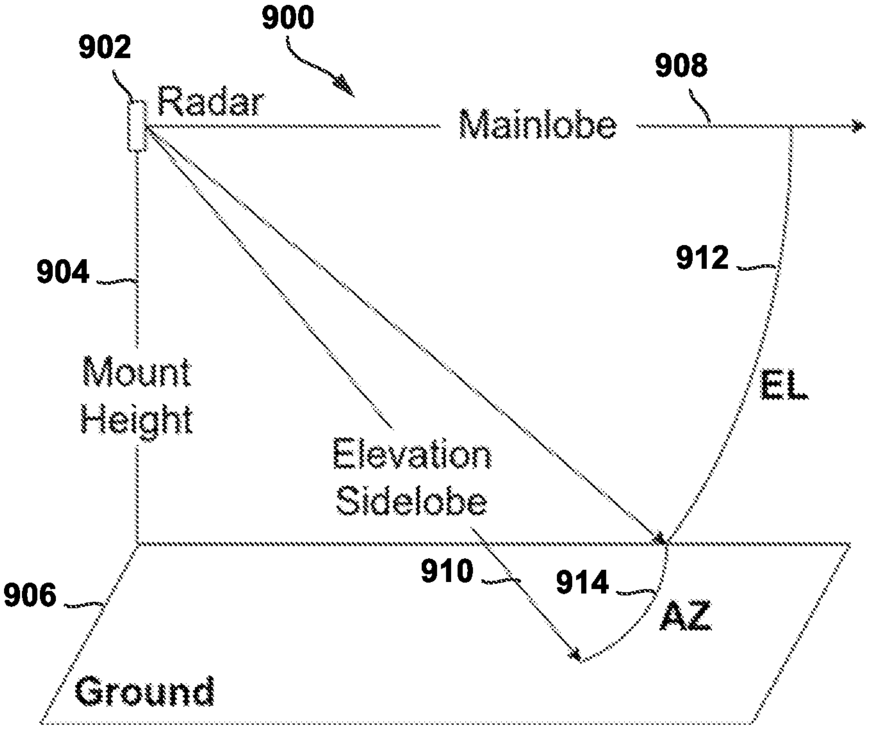
FIG. 9 is a diagram illustrating a testing environment for generating reference sidelobe measurements, according to example embodiments.

FIG. 9 is a diagram illustrating a testing environment for generating reference sidelobe measurements. The lab setup shown in FIG. 9 may be used for determining the absolute location of the elevation sidelobe for radar before mounting the radar on a vehicle. In the example lab set up, radar 902 is shown positioned at mount height 904 above flat ground 906. Radar 902 is shown transmitting a radiation pattern (similar to radiation pattern 700 shown in FIG. 7), which includes main lobe 908 and elevation sidelobe 910. In the example, elevation sidelobe 910 has elevation 912 and azimuth 914 parameters relative to main lobe 908. In terms of determining the azimuth and elevation (AZ, EL) from radar measurements, two dimensional (2D) antennas provide direct measurement of azimuth and elevation (AZ, EL) while one dimensional (1D) line arrays might not provide direct measurement of azimuth and elevation (AZ, EL). In the case of line arrays, instantaneous measurements of range and cone angle can be used.

For the lab setup shown in FIG. 9, with radar 902 positioned orthogonal to flat ground 906 at an accurately known radar mount height (H) 904, the azimuth (AZ) 914 and elevation (EL) 912 for elevation sidelobe 910 can be determined directly from generated radar data. Elevation (EL) 912 of elevation sidelobe 910 can be found using the following:

$$EL = \sin^{-1}\left(\frac{H}{R}\right) \tag{3}$$

where H is radar mount height 904 (vertical distance to the planar surface) and R is the measured range after determining the location of the elevation sidelobe response. Azimuth (AZ) can be found using the cone angle measurement and the previously computed elevation (EL) as follows:

$$AZ = \sin^{-1}\left(\frac{\cos(\text{cone})}{\sin(EL)}\right) \tag{4}$$

A number of images or detections may be generated by radar and integrated to achieve improved accuracy. In some cases, a computing system may use curve fitting or smoothing (also known as bin discrimination) to achieve precision better than a single range bin.

In other cases, a relative measurement may be sufficient to capture changes in elevation over time. For example, if a radar mount elevation is calibrated when the radar is installed, the computing system can collect radar data thereafter on the vehicle to know the starting position of the elevation sidelobe to generate a reference point, which can be used to detect when position changes over time. These changes relative to the reference point can be translated into a pitch change.

Line arrays, which are antenna arrays without multiple vertically spaced transmit and/or receive elements, might lack the ability to measure elevation or azimuth directly. Instead, the line arrays can be used to measure cone angle, which is a combined measure of azimuth (AZ) and elevation (EL) away from the boresight direction of an array face.

Figure 10:
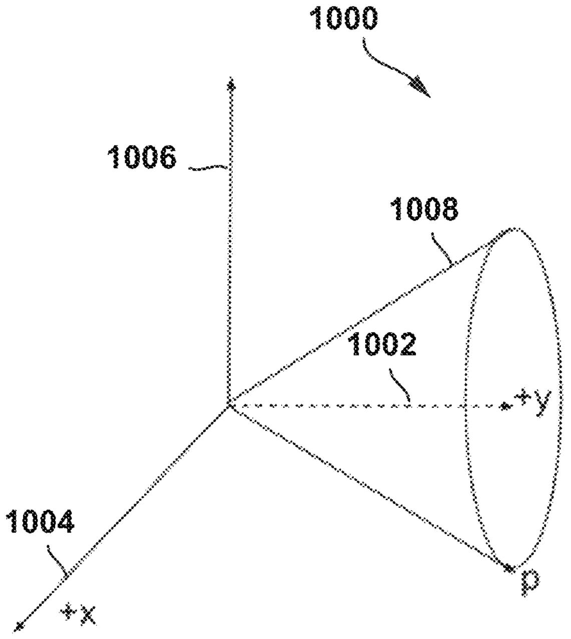
FIG. 10 is a diagram showing line array cone angle coordinates, according to example embodiments.

FIG. 10 is a diagram showing line array cone angle coordinates. As shown in FIG. 10, the Y-axis is orthogonal to the antenna, while the Z-axis is an elevation relative to the radar and the X-axis is in-plane with the line array. The cone angle (θ) can be represented as a projection of any ray (p), back onto the boresight direction ($p_y$) from the following equation:

$$\theta = \sin^{-1}\left(\frac{p_y}{\|p\|}\right) \tag{5}$$

The resulting after angle processing is then a measure of cone angle, which through the additional constraints, namely knowledge of the height of the radar and its relative pitch to the ground that can be controlled accurately in a lab setting, is able to be converted to azimuth, elevation (AZ, EL) using Equations 3 and 4.

A radar that uses a linear array produces a directional transmission pattern. The linear array consists of multiple antenna elements arranged in a line. By adjusting the phase and amplitude of the signals across the antenna array elements, the array can create a focused and steerable beam in a specific transmission angle. Beam steering may be used to improve the SNR of the detectable sidelobe.

In some examples, radar range-angle power images are used to show areas of high power where the elevation sidelobe is present. These are areas where the elevation sidelobe intersects the ground and will be a function of elevation sidelobe antenna location (AZ, EL) and the height of the radar (Z). In some instances, the 0-pitch (ideal) elevation sidelobe (AZ, EL) location is determined via testing within a lab setting or field testing through direct radar measurements and knowledge of the radar mount height relative to the underlying ground surface.

Figure 11:
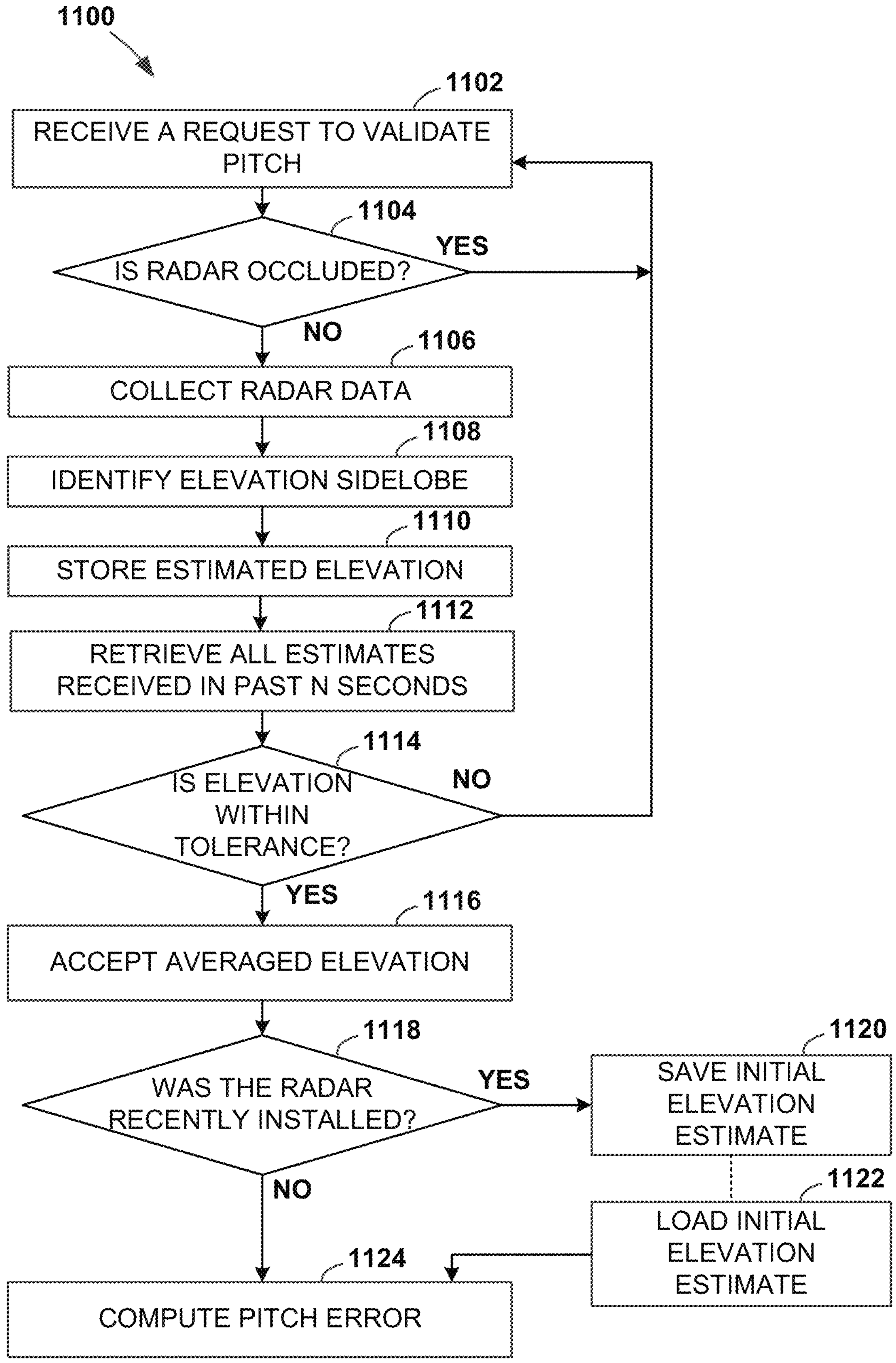
FIG. 11 is a flowchart of a method for generating a reference sidelobe measurement, according to example embodiments.

FIG. 11 is a flow chart of method 1100 for determining and using a reference sidelobe measurement to validate radar pitch. Method 1100 may include one or more operations, functions, or actions as illustrated by one or more of blocks 1102, 1104, 1106, 1108, 1110, 1112, 1114, 1116, 1118, 1120, 1122, and 1124. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 1100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. Various types of computing systems can be used to perform method 1100 and other methods described herein.

At block 1102, method 1100 involves receiving a request to validate the pitch. The vehicle radar system or another computing system may receive the request from other vehicle systems or based on a schedule. In addition, the request can be periodic (e.g., every 10 minutes or hourly) or at a time determined by the vehicle radar system to evaluate radar pitch. In some examples, the computing system may validate the pitch of each radar located on the vehicle after the vehicle was not used for a threshold duration. Similarly, other schedules for validating the pitch of each radar can be used. For instance, a computing system may validate each radar after dropping off a passenger and prior to picking up another passenger.

The initial pitch of the radar can be measured in various ways within examples. For instance, sensors or instruments can measure the pitch to determine the tilt or rotation angle of the radar antenna in the vertical plane. In some examples, inclinometers or title sensors may be used to supplement pitch estimates.

At block 1104, method 1100 involves determining if the radar is occluded. The computing system may determine if the radar is occluded based on raw radar data or by using higher level system outputs, such as perception objects. In some examples, the computing system may use additional filtering to improve the accuracy of the result, such as using localization, other sensor data (such as laser or camera) or perception to determine the flatness of the surface to improve the radar pitch estimate. In some cases, such as for data collected in a lab setting, these tests may be omitted as they are controlled and guaranteed to be met by the setup.

At block 1106, method 1100 involves collecting radar data. In some examples, radar data is collected in a lab setting. For lab setups, the transmission of multiple CPIs at a time may be collected by a radar at a fixed height relative to a flat ground surface with a known target. In other examples, radar data can be generated and collected after initial installation of the radar onto the vehicle or a calibration event of the radar. For instance, the computing system may obtain and collect radar data based on operations of the radar during vehicle navigation.

At block 1108, method 1100 involves identifying an elevation sidelobe for each CPI that meets the collection waveform requirements. For example, in some cases, only waveforms with a specific range resolution are utilized in the algorithm. The computing system can use a filtering process to detect the elevation sidelobe, which can be a region corresponding to a distance from the nominal sidelobe response.

In some examples, the computing system can be programmed to recognize an expected radiation pattern with sidelobes appearing as weaker signals in regions outside the main beam. By comparing the received signals to the expected pattern, the computing system can identify deviations that correspond to sidelobes. By knowing its orientation, the elevation sidelobe can be detected and identified by the computing system. The computing system can use signal processing algorithms to analyze and process received radar signals. The algorithms can filter out unwanted signals and/or apply specific criteria that differentiates between the main lobe and sidelobes. The criteria can include signal strength, direction, and spatial distribution. Spatial filtering techniques can also be used to analyze signals based on their angular position and intensity. The computing system can isolate signals coming from the main lobe versus those originating from sidelobes by factoring the range, angle, Doppler and strength of the received signals. In addition, sidelobes typically have a lower signal strength relative to the main lobe. The computing system can analyze the SNR to differentiate between the stronger main lobe signals and the weaker sidelobe signals.

At block 1110, method 1100 involves storing the estimated elevation. For instance, the computing system can estimate an azimuth and/or elevation measurements corresponding to elevation sidelobe and save these values for future reference and comparisons. Other parameters can be also measured and stored for subsequent use by the computing system.

At block 1112, method 1100 involves retrieving the sequence of elevation estimates that are grouped in this measurement (e.g., estimates within the past number of seconds can be used). The computing system may retrieve the sequence of elevation estimates to improve the elevation estimate by integrating a number of recent elevation estimates to produce an estimate with a reduced standard deviation of error.

At block 1114, method 1100 involves performing a test to evaluate if the standard deviation of the elevation measurements is within bounds to accept the elevation measurement. If the deviation of the elevation measurements is not within the bounds, the computing system may determine that more data should be collected and used, causing method 1100 to return back to block 1102 as shown in FIG. 11.

At block 1116, method 1100 involves accepting an averaged elevation, which can be estimated based on a number of estimations of the elevation of the elevation sidelobe. Different techniques can be used to determine an averaged parameter corresponding to the elevation sidelobe.

At block 1118, method 1100 involves determining if the radar was recently installed. If the radar was recently installed on the vehicle, the computing system proceeds to block 1120 and saves the elevation estimate (or other parameter estimate (e.g., azimuth estimate)). By saving the elevation estimate, the computing system can use the elevation estimate as a reference point for future comparisons. If the computing system determines that the radar was not recently installed, the computing system proceeds to compute pitch error at block 1124 of method 1100.

In some examples, if the elevation of the elevation sidelobe was previously computed in a lab or from a previous installation estimate, the previous elevation estimate can be retrieved from at block 1122, which involves loading the initial elevation estimate that was previously saved at block 1120 (or generated in a lab setting). The initial elevation estimate can be used to compute the pitch error at block 1124.

At block 1124, method 1100 involves computing the pitch error. The current pitch error can be estimated based on the difference of the two elevation sidelobe elevation measurements. Since the elevation of the elevation sidelobe measurement is the inverse value of the pitch of the radar, the pitch is then computed as the inverse of the elevation of the elevation sidelobe compared against the reference elevation sidelobe elevation. Reporting elevation can involve generating a reference sidelobe measurement that can be used to detect changes in the pitch of the radar over time that can change due to navigation of the vehicle. The result of block 1124 is a pitch error estimate reported to the computing system.

In some examples, the computing system compares parameters of the elevation sidelobe to stored parameters of the elevation sidelobe, which were generated and stored shortly after the radar was initially installed onto the vehicle.

In some examples, disclosed techniques may involve generating an acceptable measurement when the radar is viewing flat terrain (e.g., street curbs which can throw off the measurement) and not occluded by other vehicles. In addition, the computing system may use radar data (and possibly other sensor data) obtained when the vehicle is not accelerating. In some cases, perception techniques and other vehicle systems can be used to improve filter decision making for this process.

In some examples, vehicle computing systems can perform the pitch validation process during a localization process performed to calibrate sensors. If the computing systems fail to validate the pitch of a radar, the computing systems may block autonomous navigation and request the vehicle to be taken to technicians who could correct the radar pitch. In some instances, the computing systems may enable autonomous navigation with the system refraining from using sensor data from the particular radar that did not have its pitch validated. After the radar pitch is corrected, radar and other sensor recalibrations may be required.

In cases where the vehicle is accelerating, the front of the vehicle may pitch up or down for relative longitudinal accelerations forward or backward, respectively. Since the pitch detector measures the instantaneous azimuth and elevation (AZ, EL) parameters of the elevation sidelobe, a real time vehicle pitch estimation could be computed by a vehicle computing system. Alternatively, the computing system may use a correction from another sensor's input to remove the effect of acceleration-related pitch offset. The computing system may use the pre-computed antenna pattern and vehicle pitch to correct radar sensitivity estimates. The estimates could be used by the computing system to modify the detection model to account for vehicle pitch during navigation.

In some examples, to estimate the absolute pitch error, the baseline (absolute measurement) may be determined in a lab setting or immediately after the radar is installed and has undergone pitch calibration. A relative measurement (that is installed on the vehicle but without pitch calibration) may also prove useful in understanding if the radar position changes over time.

Figure 12:
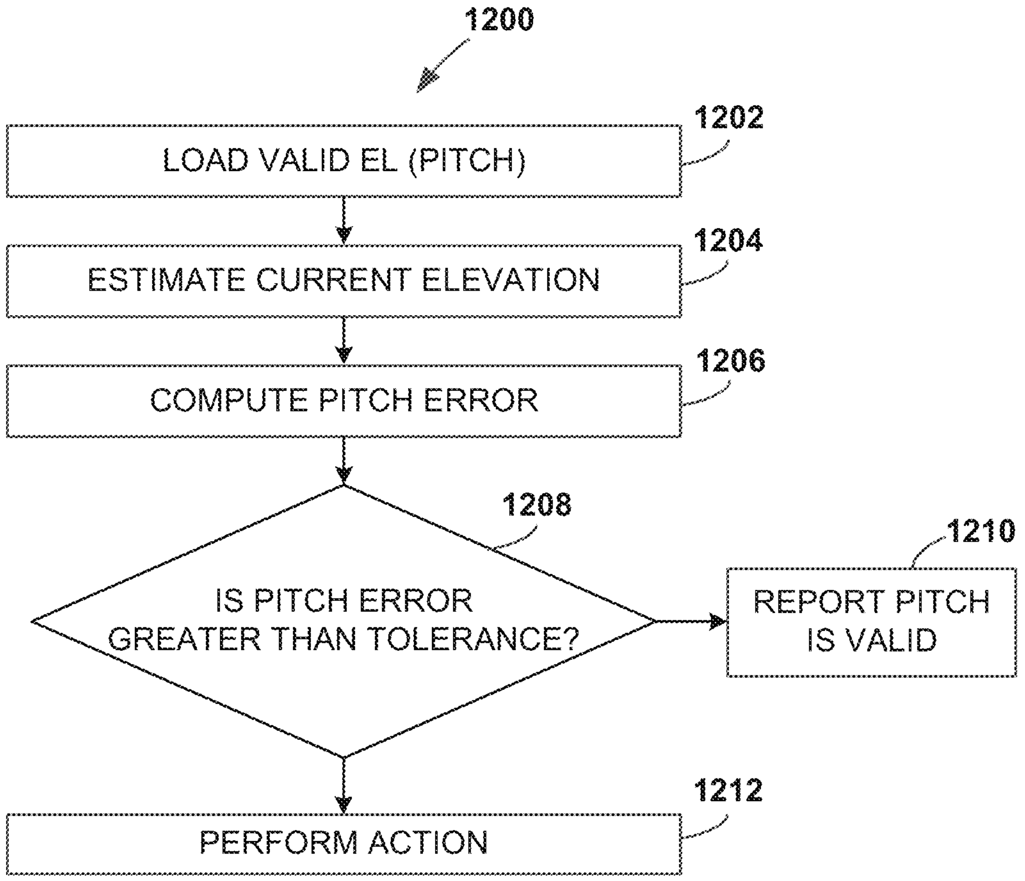
FIG. 12 is a flow chart of method 1200 for validating a radar using sidelobe measurements, according to example embodiments.

Once the initial elevation sidelobe (AZ, EL) parameters have been measured, pitch (or alternatively roll or yaw) changes may be observed by the computing system, which detects the changes in the observed range and azimuth response of the radar through comparison to the initial measurement by repeating the same process as described in FIG. 12. In some examples, vehicle computing systems may use roll or yaw measurements of the elevation sidelobe or another sidelobe for techniques described herein, including pitch validation of each radar coupled on the vehicle.

FIG. 12 is a flow chart of method 1200 for validating a radar using sidelobe measurements. Method 1200 may include one or more operations, functions, or actions as illustrated by one or more of blocks 1202, 1204, 1206, and 1208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1202, method 1200 involves loading a reference sidelobe measurement. The reference sidelobe measurement can be generated in a calibrated lab setting in some examples. In other examples, the reference sidelobe measurement is generated using sidelobe measurements after the radar is installed on the vehicle.

At block 1204, method 1200 involves estimating a current sidelobe measurement. The computing system can obtain radar measurements, locate the sidelobe, and estimate the current sidelobe measurements. For instance, the computing system may evaluate the elevation sidelobe and estimate elevation and azimuth parameters for the elevation sidelobe.

At block 1206, method 1200 involves computing a pitch error. Computing the pitch error can involve determining a difference between the reference sidelobe measurement and the current sidelobe measurement. For instance, the computing system may compare the elevation and/or azimuth parameters for the elevation sidelobe to the elevation and/or azimuth parameters of the reference sidelobe measurements.

At block 1208, method 1200 involves comparing the pitch error to a tolerance value. If the pitch error is less than the allowed tolerance, method 1200 proceeds to report that pitch is valid at block 1210. If the pitch error is greater than the allowed tolerance, method 1200 proceeds to perform a calibration operation.

For instance, if the pitch error exceeds the threshold, the radar may require correction of pitch. The computing system may provide an alert for the radar to be reinstalled and/or have the pitch manually adjusted to return to a valid pitch state. Additionally, the computing system may continue operating and alert downstream modules if the pitch is determined to be out of desired specifications while driving. With knowledge of the antenna gain, the pitch error can be converted to a sensitivity reduction and/or a reduction in max track range and shared radar and other downstream modules. In some examples, the computing system may use multiple thresholds to determine when to continue navigation and when to require manual adjustment of the radar.

Figure 13:
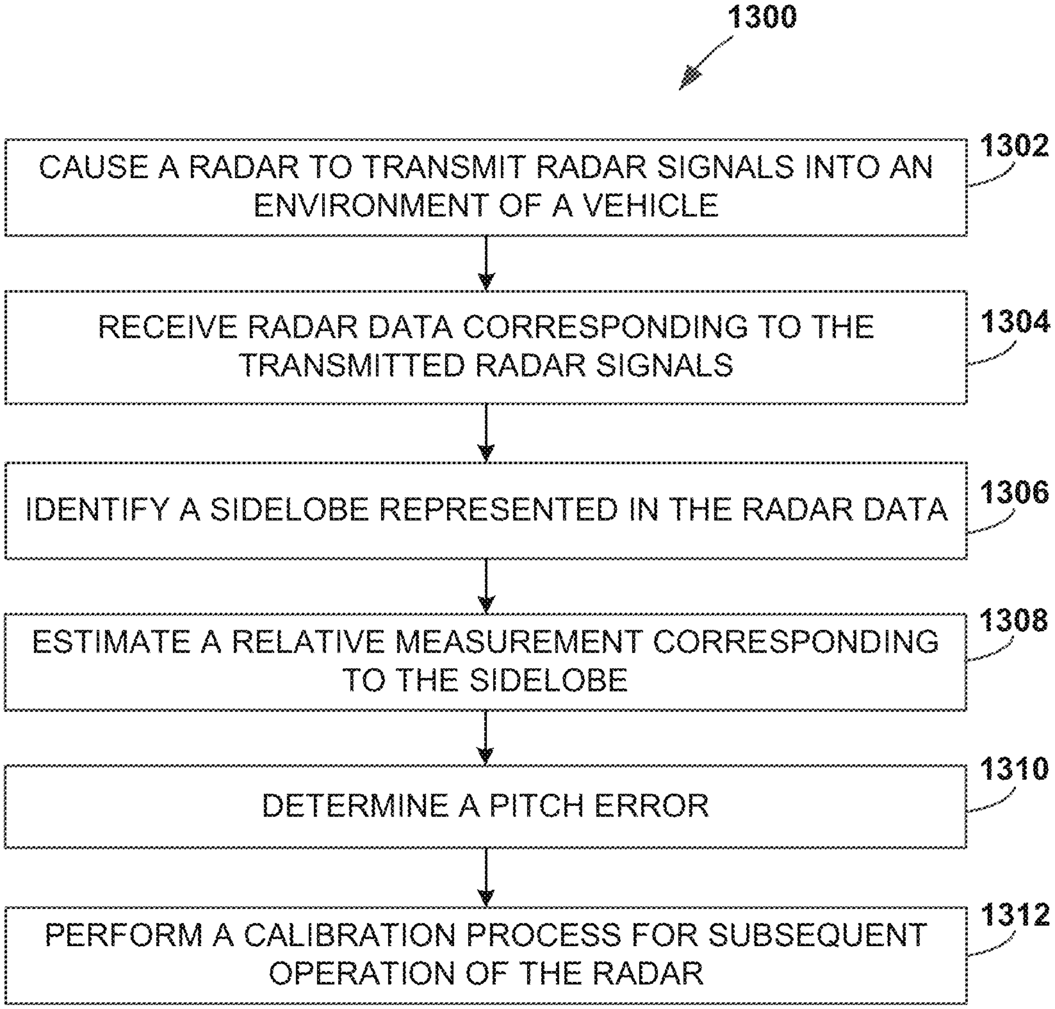
FIG. 13 is a flow chart of another method 1300 for validating a radar using sidelobe measurements.

FIG. 13 is a flow chart of another method 1300 for validating a radar using sidelobe measurements. Method 1300 may include one or more operations, functions, or actions as illustrated by one or more of blocks 1302, 1304, 1306, 1308, 1310, and 1312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1302, method 1300 involves causing a radar to transmit radar signals into an environment of a vehicle. A computing system coupled to the vehicle can cause the radar to transmit the radar signals. In some examples, the computing system causes the radar to transmit radar signals through a pitched radome. The pitched radome can protect the radar and also reflect energy corresponding to the sidelobe.

At block 1304, method 1300 involves receiving, at the computing system, radar data corresponding to the transmitted radar signals. The data used for this can vary by application/digital signal processing (DSP) design. Conventional radar systems using detections may choose to aggregate detections (range, Doppler, azimuth, power). So-called 4D radars additionally include elevation in detection estimates and would use aggregated (range, Doppler, azimuth, elevation, power) values. Other systems may choose to use radar images such as range-angle power maps for integrating power and use range-Doppler Maps (RDM) as a way to improve filtering.

At block 1306, method 1300 involves identifying a sidelobe represented in the radar data. In some examples, the computing system identifies a particular sidelobe within the radiation pattern, such as the elevation sidelobe. The elevation sidelobe can depend on the orientation and position of the radar.

In some examples, the computing system can be programmed to recognize an expected radiation pattern with sidelobes appearing as weaker signals in regions outside the main beam. By comparing the received signals to the expected pattern, the computing system can identify deviations that correspond to sidelobes. By knowing its orientation, the elevation sidelobe can be detected and identified.

The computing system can use signal processing algorithms to analyze and process received radar signals. The algorithms can filter out unwanted signals and/or apply specific criteria that differentiates between the main lobe and sidelobes. The criteria can include signal strength, direction, and spatial distribution. Spatial filtering techniques can also be used to analyze signals based on their angular position and intensity. The computing system can isolate signals coming from the main lobe versus those originating from sidelobes by factoring the angle and strength of the received signals. In addition, sidelobes typically have a lower signal strength relative to the main lobe. The computing system can analyze the signal-to-noise ratio (SNR) to differentiate between the stronger main lobe signals and the weaker sidelobe signals.

At block 1308, method 1300 involves estimating a relative measurement corresponding to the sidelobe. The relative measurement corresponding to the sidelobe represents at least an elevation measurement or an azimuth measurement corresponding to the sidelobe. In some examples, the computing system identifies an elevation sidelobe represented in the radar and then estimates the elevation measurement corresponding to the elevation sidelobe.

At block 1310, method 1300 involves determining a pitch error based on a comparison between the relative measurement of the sidelobe and a reference sidelobe measurement. In some examples, the reference sidelobe can be determined using a lab setting or as part of normal radar calibrations associated with preparation of the radar for installation on the vehicle. In other examples, the reference sidelobe can also be determined initially after installing the radar onto the vehicle at a known height above a flat ground. The reference sidelobe can be associated with the desired pitch for the radar.

In some examples, a preset reference for the elevation sidelobe can be initially received by the computing system and subsequently used. For instance, the computing system may load and adjust the preset reference to accommodate particular aspects of the radar, such as the antenna configuration. The preset reference can correspond to the radar model and the subsequent calibration onboard the vehicle by the computing system can adjust for the exact performance, position, and orientation of the radar when positioned on the vehicle.

The computing system may obtain the reference sidelobe measurement from a remote computing system. For instance, in some examples, method 1300 involves generating the reference sidelobe measurement in a lab setting. The lab setting positions a given radar matching the radar at a height above a ground surface based on a height of the radar when coupled to the vehicle. As such, the remote computing system can be positioned at a lab and provide the reference sidelobe measurement to the computing system onboard the vehicle as well as to other computing systems on other vehicles.

In some examples, the computing system performs the comparison between the elevation measurement corresponding to the elevation sidelobe and the reference sidelobe measurement corresponding to an absolute elevation measurement corresponding to the elevation sidelobe.

At block 1312, method 1300 involves performing a calibration process for subsequent operation of the radar. The computing system can perform the calibration process based on the pitch error. The calibration process can vary within examples. For instance, the computing system can apply an update to one or more radar models used for operating the radar. In some cases, the computing system may provide an alert that prompts for an adjustment of the pitch of the radar. In addition, the computing system may also provide an alert that prompts for a replacement of the radar.

In some examples, method 1300 further involves performing a given comparison between the pitch error and a threshold pitch error and then performing the calibration process based on the given comparison between the pitch error and the threshold pitch error. In some cases, the computing system determines that the pitch error is greater than the threshold pitch error. Based on determining that the pitch error is greater than the threshold pitch error, the computing system can provide an alert prompting for recalibration of a mount which couples the radar to the vehicle. In other cases, the computing system determines that the pitch error is less than the threshold pitch error. Based on determining that the pitch error is less than the threshold pitch error, the computing system may perform a software-based calibration process that reduces the impact of the pitch error.

In some examples, method 1300 involves monitoring relative measurements corresponding to the sidelobe across subsequent radar data obtained during navigation and detecting a change in the relative measurements corresponding to the sidelobe. The computing system can then identify a road grade change of a road traveled by the vehicle during navigation based on detecting the change in the relative measurements corresponding to the sidelobe.

In some examples, method 1300 involves monitoring relative measurements corresponding to the sidelobe across subsequent radar data obtained during navigation and estimating a speed of the vehicle based on monitoring the relative measurements corresponding to the sidelobe. The computing system can monitor precise changes in the speed and acceleration of the vehicle using sidelobe data.

In further examples, the computing system can monitor relative measurements corresponding to the sidelobe across subsequent radar data obtained during navigation and detect a change in the relative measurements corresponding to the sidelobe. The computing system can then detect precipitation on a road traveled by the vehicle during navigation based on detecting the change in the relative measurements corresponding to the sidelobe.

In some examples, the radar system can use adaptive signal processing techniques to dynamically adjust parameters and weights in the signal processing to enhance measurements corresponding to the sidelobes (or the elevation sidelobe in particular).

In some examples, radars are used with control electronics, which can include one or more field-programmable gate arrays (FPGAs), ASICs, CPUs, GPUs, and/or TPUs. For instance, a radar unit can generate and receive complex signals that require significant processing. One or more control electronics can be programmed to implement various signal processing algorithms, such as filtering, modulation/demodulation, noise reduction, and digital beamforming. These operations help extract relevant information from the received radar signals, enhance signal quality, and improve target detection and tracking. In addition, radar systems often involve the conversion of analog signals to digital format for further processing. The control electronics can include analog-to-digital converters (ADCs) and digital-to-analog converters (DACs) to facilitate these conversions. The control electronics can receive analog signals from radar sensors, digitize them, and process the digital data for analysis and interpretation.

In addition, the control electronics can also provide the capability for real-time control and coordination of various radar system components. For instance, the control electronics can handle synchronization, timing generation, and system control, ensuring the proper timing and sequencing of operations within the radar system. This real-time control is crucial for accurate and synchronized signal transmission and reception. The control electronics can efficiently handle large amounts of data generated by the radar system. The control electronics can implement data storage, buffering, and data flow management techniques, enabling efficient data handling during signal transmission. This includes tasks such as data compression, data packetization, and data routing, ensuring smooth and reliable data transmission within the radar system. The control electronics can also integrate various interfaces and protocols required for radar signal transmission, such as processors, memory modules, communication modules, and display units. The control electronics can provide the necessary interface logic to facilitate seamless data exchange between these components, enabling efficient data flow and system integration. The control electronics can also be reconfigured and customized to meet specific radar system requirements and adapt to changing operational needs. This allows radar system designers to implement and optimize algorithms and functionalities specific to their application, resulting in enhanced performance and efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

causing, by a computing system coupled to a vehicle, a radar to transmit radar signals into an environment of the vehicle, wherein a radiation pattern of the radar includes a main lobe and an elevation sidelobe;

receiving, at the computing system, radar data corresponding to the transmitted radar signals;

identifying the elevation sidelobe represented in the radar data based on a signal strength of the elevation sidelobe being below a signal strength of the main lobe and above a noise floor;

estimating a relative measurement corresponding to the elevation sidelobe, wherein the relative measurement corresponding to the elevation sidelobe represents an elevation measurement corresponding to the elevation sidelobe;

determining a pitch error based on a comparison between the relative measurement corresponding to the elevation sidelobe and a reference sidelobe measurement, wherein the reference sidelobe measurement comprises an initial elevation measurement of the elevation sidelobe stored in a memory, and wherein the pitch error represents a change in pitch of the radar based on a difference between the elevation measurement corresponding to the elevation sidelobe and the initial elevation measurement; and based on the pitch error, performing a calibration process for subsequent operation of the radar.

2. The method of claim 1, wherein causing the radar to transmit radar signals into the environment comprises:

causing the radar to transmit radar signals through a pitched radome, wherein the pitched radome is configured to reflect energy corresponding to the elevation sidelobe.

3. The method of claim 1, further comprising:

performing a given comparison between the pitch error and a threshold pitch error; and performing the calibration process based on the given comparison between the pitch error and the threshold pitch error.

4. The method of claim 3, further comprising:

determining the pitch error is greater than the threshold pitch error; and based on determining the pitch error is greater than the threshold pitch error, providing an alert that prompts for recalibration of a mount that couples the radar to the vehicle.

5. The method of claim 3, further comprising:

determining the pitch error is less than the threshold pitch error; and based on determining the pitch error is less than the threshold pitch error, performing a software-based calibration process.

6. The method of claim 1, further comprising:

generating the reference sidelobe measurement in a lab setting, wherein the lab setting positions a given radar matching the radar at a height above a ground surface based on a height of the radar when coupled to the vehicle; and transmitting the reference sidelobe measurement to a plurality of vehicles having radars that match the radar.

7. The method of claim 1, further comprising:

obtaining the reference sidelobe measurement from a remote computing system.

8. The method of claim 1, wherein performing the calibration process for subsequent operation of the radar comprises:

applying an update to one or more radar models used for operating the radar.

9. The method of claim 1, wherein performing the calibration process for subsequent operation of the radar comprises:

providing an alert that prompts for adjusting a pitch of the radar.

10. The method of claim 1, wherein performing the calibration process for subsequent operation of the radar comprises:

providing an alert that prompts for a replacement of the radar.

11. The method of claim 1, further comprising:

monitoring relative measurements corresponding to the elevation sidelobe across subsequent radar data obtained during navigation;

detecting a change in the relative measurements corresponding to the elevation sidelobe; and identifying a road grade change of a road traveled by the vehicle during navigation based on detecting the change in the relative measurements corresponding to the elevation sidelobe.

12. The method of claim 1, further comprising:

monitoring relative measurements corresponding to the elevation sidelobe across subsequent radar data obtained during navigation; and estimating a speed of the vehicle based on monitoring the relative measurements corresponding to the elevation sidelobe.

13. The method of claim 1, further comprising:

monitoring relative measurements corresponding to the elevation sidelobe across subsequent radar data obtained during navigation;

detecting a change in the relative measurements corresponding to the elevation sidelobe; and detecting precipitation on a road traveled by the vehicle during navigation based on detecting the change in the relative measurements corresponding to the elevation sidelobe.

14. The method of claim 1, further comprising:

performing a comparison between the elevation measurement corresponding to the elevation sidelobe and the reference sidelobe measurement, wherein the reference sidelobe measurement corresponds to an absolute elevation measurement corresponding to the elevation sidelobe.

15. The method of claim 1, wherein the elevation sidelobe is directed toward a ground surface supporting the vehicle.

16. A system comprising:

a radar coupled to a vehicle; and a computing device configured to:

cause the radar to transmit radar signals into an environment of the vehicle, wherein a radiation pattern of the radar includes a main lobe and an elevation sidelobe;

receive radar data corresponding to the transmitted radar signals;

identify the elevation sidelobe represented in the radar data based on a signal strength of the elevation sidelobe being below a signal strength of the main lobe and above a noise floor;

estimate a relative measurement corresponding to the elevation sidelobe, wherein the relative measurement corresponding to the elevation sidelobe represents an elevation measurement corresponding to the elevation sidelobe;

determine a pitch error based on a comparison between the relative measurement corresponding to the elevation sidelobe and a reference sidelobe measurement, wherein the reference sidelobe measurement comprises an initial elevation measurement of the elevation sidelobe stored in a memory, and wherein the pitch error represents a change in pitch of the radar based on a difference between the elevation measurement corresponding to the elevation sidelobe and the initial elevation measurement; and based on the pitch error, perform a calibration process for subsequent operation of the radar.

17. The system of claim 16, further comprising:

a pitched radome configured to protect the radar and reflect energy corresponding to the elevation sidelobe when transmitted by the radar.

18. The system of claim 16, wherein the reference sidelobe measurement is generated after the radar is installed on the vehicle.

19. The system of claim 16, wherein the relative measurement corresponding to the elevation sidelobe is based on a plurality of estimations.

20. A non-transitory computer-readable medium configured to store instructions, that when executed by a computing system comprising one or more processors, causes the computing system to perform operations comprising:

causing a radar to transmit radar signals into an environment of a vehicle, wherein a radiation pattern of the radar includes a main lobe and an elevation sidelobe;

receiving radar data corresponding to the transmitted radar signals;

identifying the elevation sidelobe represented in the radar data based on a signal strength of the elevation sidelobe being below a signal strength of the main lobe and above a noise floor;

estimating a relative measurement corresponding to the elevation sidelobe, wherein the relative measurement corresponding to the elevation sidelobe represents an elevation measurement corresponding to the elevation sidelobe;

determining a pitch error based on a comparison between the relative measurement corresponding to the elevation sidelobe and a reference sidelobe measurement, wherein the reference sidelobe measurement comprises an initial elevation measurement of the elevation sidelobe stored in a memory, and wherein the pitch error represents a change in pitch of the radar based on a difference between the elevation measurement corresponding to the elevation sidelobe and the initial elevation measurement; and based on the pitch error, performing a calibration process for subsequent operation of the radar.

* * * * *